US012699207B2

(12) United States Patent     (10) Patent No.:   US 12,699,207 B2

Latawiec et al.     (45) Date of Patent:     Aug. 4, 2026

(54) SHARED-APERTURE CAMERA SYSTEM AND CALIBRATION METHOD

(71) Applicant: Metalenz, Inc., Boston, MA (US)

(72) Inventors: Pawel Latawiec, Chicago, IL (US); Seyedali Forouzmand, Malden, MA (US); Meng Lu, Boston, MA (US); Mohammad Salary, San Francisco, CA (US); Anne Janet Milliez, Cambridge, MA (US); John W. Graff, Swampscott, MA (US)

(73) Assignee: Metalenz, Inc., Boston, MA (US)

( * ) Notice: Subject to any disclaimer, the term of this patent is extended or adjusted under 35 U.S.C. 154(b) by 363 days.

(21) Appl. No.: 18/481,085

(22) Filed: Oct. 4, 2023

(65) Prior Publication Data

US 2024/0118456 A1     Apr. 11, 2024

Related U.S. Application Data

(60) Provisional application No. 63/378,427, filed on Oct. 5, 2022.

(51) Int. Cl.
*G02B 1/00*     (2006.01)
*G02B 27/28*     (2006.01)
       (Continued)

(52) U.S. Cl.
CPC ........... *G02B 1/002* (2013.01); *G02B 27/286* (2013.01); *G02B 27/4205* (2013.01);
       (Continued)

(58) Field of Classification Search
CPC .. G02B 1/002; G02B 27/4205; G02B 27/286; H04N 23/55; H04N 23/951; H04N 17/002
See application file for complete search history.

(56) References Cited

U.S. PATENT DOCUMENTS 3,877,034 A     4/1975    Nelson
4,777,116 A    10/1988   Kawatsuki et al.
            (Continued)

FOREIGN PATENT DOCUMENTS

CA     3006173 A1    6/2017
CA     3020261 A1   10/2017
            (Continued)

OTHER PUBLICATIONS

Rubin et al. Matrix Fourier optics enables a compact full-stokes polarization camera, (Year: 2019).*

(Continued)

*Primary Examiner* — Ephrem Z Mebrahtu

(74) *Attorney, Agent, or Firm* — KPPB LLP

(57)         ABSTRACT

Disclosed herein is various shared-aperture camera systems and calibration methods. One particular shared-aperture camera system includes a polarization imaging device including: an aperture; a first metasurface configured to diffract incident light going through the aperture such that a first polarization of incident light diffracts in a first direction and a second polarization of the incident light diffracts in a second direction; an image sensor; and a planar diffractive lens including a second metasurface configured to focus the first polarization of incident light diffracted in the first direction onto a first portion of the image sensor and focus the second polarization of incident light diffracted in the second direction onto a second portion of the image sensor.

15 Claims, 12 Drawing Sheets

(51) Int. Cl.

| | | |
|---|---|---|
| *G02B 27/42* | (2006.01) | |
| *H04N 17/00* | (2006.01) | |
| *H04N 23/55* | (2023.01) | |
| *H04N 23/951* | (2023.01) | |

(52) U.S. Cl.
CPC ........... *H04N 17/002* (2013.01); *H04N 23/55* (2023.01); *H04N 23/951* (2023.01)

(56) References Cited

U.S. PATENT DOCUMENTS

| | | | |
|---|---|---|---|
| 4,856,899 | A | 8/1989 | Iwaoka et al. |
| 5,085,496 | A | 2/1992 | Yoshida et al. |
| 5,245,466 | A | 9/1993 | Burns et al. |
| 5,337,146 | A | 8/1994 | Azzam |
| 5,452,126 | A | 9/1995 | Johnson |
| 5,620,792 | A | 4/1997 | Challener, IV |
| 5,840,447 | A | 11/1998 | Peng |
| 6,097,856 | A | 8/2000 | Hammond, Jr. |
| 6,643,065 | B1 | 11/2003 | Dowski, Jr. |
| 6,669,803 | B1 | 12/2003 | Kathman et al. |
| 6,731,839 | B2 | 5/2004 | Bhagavatula et al. |
| 6,825,986 | B2 | 11/2004 | Ashkinazy et al. |
| 6,834,027 | B1 | 12/2004 | Sakaguchi et al. |
| 6,924,457 | B2 | 8/2005 | Koyama et al. |
| 6,927,922 | B2 | 8/2005 | George et al. |
| 7,057,151 | B2 | 6/2006 | Lezec et al. |
| 7,061,612 | B2 | 6/2006 | Johnston |
| 7,061,693 | B2 | 6/2006 | Zalevsky |
| 7,171,078 | B2 | 1/2007 | Sasaki et al. |
| 7,171,084 | B2 | 1/2007 | Izumi et al. |
| 7,186,969 | B2 | 3/2007 | Altendorf et al. |
| 7,241,988 | B2 | 7/2007 | Gruber et al. |
| 7,324,210 | B2 | 1/2008 | De et al. |
| 7,327,468 | B2 | 2/2008 | Maznev et al. |
| 7,402,131 | B2 | 7/2008 | Mueth et al. |
| 7,450,618 | B2 | 11/2008 | Dantus et al. |
| 7,547,874 | B2 | 6/2009 | Liang |
| 7,561,264 | B2 | 7/2009 | Treado et al. |
| 7,576,899 | B2 | 8/2009 | Kanesaka et al. |
| 7,679,830 | B2 | 3/2010 | Dowski, Jr. |
| 7,684,097 | B2 | 3/2010 | Fukumoto et al. |
| 7,773,307 | B2 | 8/2010 | Shih |
| 7,800,683 | B2 | 9/2010 | Zalevsky et al. |
| 7,812,295 | B2 | 10/2010 | Zalevsky et al. |
| 7,928,900 | B2 | 4/2011 | Fuller et al. |
| 7,929,220 | B2 | 4/2011 | Sayag |
| 7,965,607 | B2 | 6/2011 | Fukumoto et al. |
| 8,009,358 | B2 | 8/2011 | Zalevsky et al. |
| 8,040,604 | B2 | 10/2011 | Zalevsky et al. |
| 8,107,705 | B2 | 1/2012 | Dowski, Jr. et al. |
| 8,152,307 | B2 | 4/2012 | Duelli et al. |
| 8,169,703 | B1 | 5/2012 | Mossberg et al. |
| 8,192,022 | B2 | 6/2012 | Zalevsky |
| 8,212,866 | B2 | 7/2012 | Lemmer et al. |
| 8,318,386 | B2 | 11/2012 | Kobrin |
| 8,328,396 | B2 | 12/2012 | Capasso et al. |
| 8,351,048 | B2 | 1/2013 | Millerd |
| 8,351,120 | B2 | 1/2013 | Deng et al. |
| 8,390,932 | B2 | 3/2013 | Jia et al. |
| 8,400,494 | B2 | 3/2013 | Zalevsky et al. |
| 8,430,513 | B2 | 4/2013 | Chang et al. |
| 8,451,368 | B2 | 5/2013 | Sung et al. |
| 8,472,797 | B2 | 6/2013 | Ok et al. |
| 8,481,948 | B2 | 7/2013 | Frach et al. |
| 8,558,873 | B2 | 10/2013 | Mceldowney |
| 8,587,474 | B2 | 11/2013 | Fuller et al. |
| 8,649,631 | B2 | 2/2014 | Islam et al. |
| 8,681,428 | B1 | 3/2014 | Brown |
| 8,687,040 | B2 | 4/2014 | Silveira |
| 8,716,677 | B2 | 5/2014 | Cui |
| 8,734,033 | B2 | 5/2014 | Walters et al. |
| 8,743,923 | B2 | 6/2014 | Geske et al. |
| 8,816,460 | B2 | 8/2014 | Kalevo et al. |
| 8,848,273 | B2 | 9/2014 | Yu et al. |
| 8,876,289 | B2 | 11/2014 | Diaz et al. |
| 8,908,149 | B2 | 12/2014 | Freimann |
| 8,912,973 | B2 | 12/2014 | Werner et al. |
| 8,981,337 | B1 | 3/2015 | Burckel et al. |
| 9,007,451 | B2 | 4/2015 | Rogers et al. |
| 9,116,302 | B2 | 8/2015 | Mccarthy et al. |
| 9,151,891 | B2 | 10/2015 | Ma et al. |
| 9,212,899 | B2 | 12/2015 | Johnson et al. |
| 9,298,060 | B2 | 3/2016 | Shen et al. |
| 9,309,274 | B2 | 4/2016 | Van Der Boom et al. |
| 9,310,535 | B1 | 4/2016 | Greiner et al. |
| 9,329,484 | B1 | 5/2016 | Markle et al. |
| 9,330,704 | B2 | 5/2016 | Nishimura et al. |
| 9,367,036 | B2 | 6/2016 | Pyun et al. |
| 9,369,621 | B2 | 6/2016 | Malone et al. |
| 9,391,700 | B1 | 7/2016 | Bruce et al. |
| 9,392,153 | B2 | 7/2016 | Myhre et al. |
| 9,411,103 | B2 | 8/2016 | Astratov |
| 9,482,796 | B2 | 11/2016 | Arbabi et al. |
| 9,500,771 | B2 | 11/2016 | Liu et al. |
| 9,536,362 | B2 | 1/2017 | Sarwar et al. |
| 9,553,423 | B2 | 1/2017 | Chen et al. |
| 9,557,585 | B1 | 1/2017 | Yap et al. |
| 9,606,415 | B2 | 3/2017 | Zheludev et al. |
| 9,609,190 | B2 | 3/2017 | Lee et al. |
| 9,704,250 | B1 | 7/2017 | Shah et al. |
| 9,739,918 | B2 | 8/2017 | Arbabi et al. |
| 9,766,463 | B2 | 9/2017 | Border et al. |
| 9,778,404 | B2 | 10/2017 | Divliansky et al. |
| 9,825,074 | B2 | 11/2017 | Tian et al. |
| 9,829,700 | B2 | 11/2017 | Parent et al. |
| 9,835,870 | B2 | 12/2017 | Astratov et al. |
| 9,836,122 | B2 | 12/2017 | Border |
| 9,869,580 | B2 | 1/2018 | Grossinger et al. |
| 9,880,377 | B1 | 1/2018 | Safrani et al. |
| 9,885,859 | B2 | 2/2018 | Harris |
| 9,891,393 | B2 | 2/2018 | Reece |
| 9,939,129 | B2 | 4/2018 | Byrnes et al. |
| 9,947,118 | B2 | 4/2018 | Khare et al. |
| 9,952,096 | B2 | 4/2018 | Kats et al. |
| 9,958,251 | B1 | 5/2018 | Brock et al. |
| 9,967,541 | B2 | 5/2018 | Piestun |
| 9,978,801 | B2 | 5/2018 | Park et al. |
| 9,989,680 | B2 | 6/2018 | Arbabi et al. |
| 9,992,474 | B2 | 6/2018 | Grunnet-jepsen et al. |
| 9,995,859 | B2 | 6/2018 | Kamali et al. |
| 9,995,930 | B2 | 6/2018 | Arbabi et al. |
| 10,007,118 | B2 | 6/2018 | Border |
| 10,054,859 | B2 | 8/2018 | Ye et al. |
| 10,084,239 | B2 | 9/2018 | Shaver et al. |
| 10,108,085 | B2 | 10/2018 | Peters et al. |
| 10,126,466 | B2 | 11/2018 | Lin et al. |
| 10,132,465 | B2 | 11/2018 | Byrnes et al. |
| 10,149,612 | B2 | 12/2018 | Muyo et al. |
| 10,155,846 | B2 | 12/2018 | Fuji et al. |
| 10,234,383 | B2 | 3/2019 | Wang et al. |
| 10,254,454 | B2 | 4/2019 | Klug et al. |
| 10,267,957 | B2 | 4/2019 | Kamali et al. |
| 10,288,481 | B2 | 5/2019 | Day et al. |
| 10,310,148 | B2 | 6/2019 | Stewart et al. |
| 10,310,387 | B2 | 6/2019 | Palmer et al. |
| 10,315,951 | B2 | 6/2019 | Toussaint et al. |
| 10,317,667 | B2 | 6/2019 | Waller et al. |
| 10,324,314 | B2 | 6/2019 | Czaplewski et al. |
| 10,338,275 | B1 | 7/2019 | Acosta et al. |
| 10,341,640 | B2 | 7/2019 | Shechtman et al. |
| 10,345,246 | B2 | 7/2019 | Tian et al. |
| 10,345,519 | B1 | 7/2019 | Miller et al. |
| 10,365,416 | B2 | 7/2019 | Zhan et al. |
| 10,371,936 | B2 | 8/2019 | Didomenico |
| 10,386,620 | B2 | 8/2019 | Astratov et al. |
| 10,388,805 | B2 | 8/2019 | Engel et al. |
| 10,402,993 | B2 | 9/2019 | Han et al. |
| 10,408,416 | B2 | 9/2019 | Khorasaninejad et al. |
| 10,408,419 | B2 | 9/2019 | Aieta et al. |
| 10,416,565 | B2 | 9/2019 | Ahmed et al. |
| 10,435,814 | B2 | 10/2019 | Plummer et al. |
| 10,440,244 | B2 | 10/2019 | Rosenblatt et al. |
| 10,440,300 | B2 | 10/2019 | Rephaeli et al. |

(56)                  References Cited

U.S. PATENT DOCUMENTS

| | | |
|---|---|---|
| 10,466,394 B2 | 11/2019 | Lin et al. |
| 10,468,447 B2 | 11/2019 | Akselrod et al. |
| 10,481,317 B2 | 11/2019 | Peroz et al. |
| 10,514,296 B2 | 12/2019 | Han et al. |
| 10,527,832 B2 | 1/2020 | Schwab et al. |
| 10,527,851 B2 | 1/2020 | Lin et al. |
| 10,536,688 B2 | 1/2020 | Haas et al. |
| 10,539,723 B2 | 1/2020 | Tazikov et al. |
| 10,545,323 B2 | 1/2020 | Schwab et al. |
| 10,591,643 B2 | 3/2020 | Lin et al. |
| 10,670,782 B2 | 6/2020 | Arbabi et al. |
| 10,725,290 B2 | 7/2020 | Fan et al. |
| 10,795,168 B2 | 10/2020 | Riley, Jr. et al. |
| 10,816,704 B2 | 10/2020 | Arbabi et al. |
| 10,816,815 B2 | 10/2020 | Aieta et al. |
| 10,915,737 B2 | 2/2021 | Hu et al. |
| 10,916,060 B2 | 2/2021 | West et al. |
| 11,092,717 B2 | 8/2021 | Capasso et al. |
| 11,169,311 B2 | 11/2021 | Rubin et al. |
| 11,231,544 B2 | 1/2022 | Lin et al. |
| 11,298,052 B2 | 4/2022 | Palikaras et al. |
| 11,353,626 B2 | 6/2022 | You et al. |
| 11,366,296 B2 | 6/2022 | Devlin et al. |
| 11,385,104 B2 | 7/2022 | Yao et al. |
| 11,385,516 B2 | 7/2022 | Didomenico |
| 11,578,968 B1 | 2/2023 | Capasso et al. |
| 11,579,456 B2 | 2/2023 | Riley et al. |
| 11,604,364 B2 | 3/2023 | Rubin et al. |
| 11,733,535 B2 | 8/2023 | Aieta et al. |
| 11,815,668 B2 | 11/2023 | Devlin et al. |
| 11,835,680 B2 | 12/2023 | Groever et al. |
| 11,835,681 B2 | 12/2023 | Lin et al. |
| 11,867,937 B2 | 1/2024 | Rubin et al. |
| 12,416,752 B2 | 9/2025 | Rubin et al. |
| 2002/0048727 A1 | 4/2002 | Zhou et al. |
| 2002/0118903 A1 | 8/2002 | Cottrell et al. |
| 2002/0181126 A1 | 12/2002 | Nishioka |
| 2003/0077983 A1 | 4/2003 | Hagan et al. |
| 2003/0107787 A1 | 6/2003 | Bablumyan |
| 2004/0173738 A1 | 9/2004 | Mizuno |
| 2004/0184752 A1 | 9/2004 | Aoki et al. |
| 2004/0190116 A1 | 9/2004 | Lezec et al. |
| 2004/0228256 A1 | 11/2004 | Ueyama et al. |
| 2004/0258128 A1 | 12/2004 | Johs et al. |
| 2005/0151698 A1 | 7/2005 | Mohamadi |
| 2005/0161589 A1 | 7/2005 | Kim et al. |
| 2005/0211665 A1 | 9/2005 | Gao et al. |
| 2005/0220162 A1 | 10/2005 | Nakamura |
| 2005/0239003 A1 | 10/2005 | Chiodini et al. |
| 2006/0042322 A1 | 3/2006 | Mendoza et al. |
| 2006/0127829 A1 | 6/2006 | Deng et al. |
| 2006/0286488 A1 | 12/2006 | Rogers et al. |
| 2007/0024975 A1 | 2/2007 | McGrew |
| 2007/0026585 A1 | 2/2007 | Wong et al. |
| 2007/0030870 A1 | 2/2007 | Bour et al. |
| 2007/0114678 A1 | 5/2007 | Van et al. |
| 2007/0273957 A1 | 11/2007 | Zalevsky et al. |
| 2008/0014632 A1 | 1/2008 | Cunningham et al. |
| 2009/0128908 A1 | 5/2009 | Nakazawa et al. |
| 2009/0135086 A1 | 5/2009 | Fuller et al. |
| 2009/0230333 A1 | 9/2009 | Eleftheriades |
| 2009/0296223 A1 | 12/2009 | Werner et al. |
| 2010/0033701 A1 | 2/2010 | Lee et al. |
| 2010/0055621 A1 | 3/2010 | Hatakeyama et al. |
| 2010/0072170 A1 | 3/2010 | Wu et al. |
| 2010/0091224 A1 | 4/2010 | Cho et al. |
| 2010/0110430 A1 | 5/2010 | Ebbesen et al. |
| 2010/0110433 A1 | 5/2010 | Nedelcu et al. |
| 2010/0134869 A1 | 6/2010 | Bernet et al. |
| 2010/0177164 A1 | 7/2010 | Zalevsky et al. |
| 2010/0187658 A1 | 7/2010 | Wei |
| 2010/0226134 A1 | 9/2010 | Capasso et al. |
| 2010/0232017 A1 | 9/2010 | Mccarthy et al. |
| 2010/0255428 A1 | 10/2010 | Chen et al. |
| 2010/0259804 A1 | 10/2010 | Buschbeck et al. |
| 2011/0012807 A1 | 1/2011 | Sorvala |
| 2011/0019180 A1 | 1/2011 | Kruglick |
| 2011/0102877 A1 | 5/2011 | Parriaux |
| 2011/0149251 A1 | 6/2011 | Duelli |
| 2011/0187577 A1 | 8/2011 | Fuller et al. |
| 2011/0261441 A1 | 10/2011 | Zheludev et al. |
| 2012/0008133 A1 | 1/2012 | Silny et al. |
| 2012/0068347 A1 | 3/2012 | Isobayashi et al. |
| 2012/0092735 A1 | 4/2012 | Futterer et al. |
| 2012/0140235 A1 | 6/2012 | Lee et al. |
| 2012/0258407 A1 | 10/2012 | Sirat |
| 2012/0269483 A1 | 10/2012 | Mossberg et al. |
| 2012/0293854 A1 | 11/2012 | Zheludev et al. |
| 2012/0327666 A1 | 12/2012 | Liu et al. |
| 2012/0328240 A1 | 12/2012 | Ma et al. |
| 2013/0016030 A1 | 1/2013 | Liu et al. |
| 2013/0032949 A1 | 2/2013 | Lin et al. |
| 2013/0037873 A1 | 2/2013 | Suzuki et al. |
| 2013/0050285 A1 | 2/2013 | Takahashi et al. |
| 2013/0058071 A1 | 3/2013 | Ben |
| 2013/0075848 A1 | 3/2013 | Nikolic et al. |
| 2013/0194237 A1 | 8/2013 | Kyung et al. |
| 2013/0194537 A1 | 8/2013 | Mao et al. |
| 2013/0194787 A1 | 8/2013 | Geske et al. |
| 2013/0208332 A1 | 8/2013 | Yu et al. |
| 2014/0009823 A1 | 1/2014 | Park et al. |
| 2014/0043846 A1 | 2/2014 | Yang et al. |
| 2014/0085693 A1 | 3/2014 | Mosallaei et al. |
| 2014/0210835 A1 | 7/2014 | Hong et al. |
| 2014/0277433 A1 | 9/2014 | Pugh et al. |
| 2015/0011073 A1 | 1/2015 | Lei et al. |
| 2015/0017466 A1 | 1/2015 | Ayon et al. |
| 2015/0018500 A1 | 1/2015 | Gerber et al. |
| 2015/0055745 A1 | 2/2015 | Holzner et al. |
| 2015/0068599 A1 | 3/2015 | Chou |
| 2015/0090862 A1 | 4/2015 | Matsui et al. |
| 2015/0092139 A1 | 4/2015 | Eguchi |
| 2015/0098002 A1 | 4/2015 | Wang |
| 2015/0116721 A1 | 4/2015 | Kats et al. |
| 2015/0125111 A1 | 5/2015 | Orcutt et al. |
| 2015/0185000 A1 | 7/2015 | Wilson et al. |
| 2015/0185413 A1 | 7/2015 | Greiner et al. |
| 2015/0219497 A1 | 8/2015 | Johs et al. |
| 2015/0219806 A1 | 8/2015 | Arbabi et al. |
| 2015/0241608 A1 | 8/2015 | Shian et al. |
| 2015/0316717 A1 | 11/2015 | Astratov |
| 2016/0025914 A1 | 1/2016 | Brongersma et al. |
| 2016/0037146 A1 | 2/2016 | Mcgrew |
| 2016/0077261 A1 | 3/2016 | Arbabi et al. |
| 2016/0133762 A1 | 5/2016 | Blasco Claret et al. |
| 2016/0161826 A1 | 6/2016 | Shen et al. |
| 2016/0195705 A1 | 7/2016 | Betzig et al. |
| 2016/0253551 A1 | 9/2016 | Pezzaniti et al. |
| 2016/0254638 A1 | 9/2016 | Chen et al. |
| 2016/0276979 A1 | 9/2016 | Shaver et al. |
| 2016/0299337 A1 | 10/2016 | Arbabi et al. |
| 2016/0299426 A1 | 10/2016 | Gates et al. |
| 2016/0306079 A1 | 10/2016 | Arbabi et al. |
| 2016/0306157 A1 | 10/2016 | Rho et al. |
| 2016/0318067 A1 | 11/2016 | Banerjee et al. |
| 2016/0331457 A1 | 11/2016 | Varghese et al. |
| 2016/0341859 A1 | 11/2016 | Shvets et al. |
| 2016/0359235 A1 | 12/2016 | Driscoll et al. |
| 2016/0361002 A1 | 12/2016 | Palikaras et al. |
| 2016/0370568 A1 | 12/2016 | Toussaint et al. |
| 2017/0003169 A1 | 1/2017 | Shaltout et al. |
| 2017/0010466 A1 | 1/2017 | Klug et al. |
| 2017/0030773 A1 | 2/2017 | Han et al. |
| 2017/0038574 A1 | 2/2017 | Zhuang et al. |
| 2017/0045652 A1 | 2/2017 | Arbabi et al. |
| 2017/0082263 A1 | 3/2017 | Byrnes et al. |
| 2017/0090221 A1 | 3/2017 | Atwater |
| 2017/0121843 A1 | 5/2017 | Plummer et al. |
| 2017/0125911 A1 | 5/2017 | Alu et al. |
| 2017/0131460 A1 | 5/2017 | Lin et al. |
| 2017/0146806 A1 | 5/2017 | Lin et al. |
| 2017/0176758 A1 | 6/2017 | Lerner et al. |
| 2017/0186166 A1 | 6/2017 | Grunnet-jepsen et al. |
| 2017/0201658 A1 | 7/2017 | Rosenblatt et al. |

(56) References Cited

U.S. PATENT DOCUMENTS

| | | |
|---|---|---|
| 2017/0212285 A1 | 7/2017 | Arbabi et al. |
| 2017/0235162 A1 | 8/2017 | Shaltout et al. |
| 2017/0250577 A1 | 8/2017 | Ho et al. |
| 2017/0293141 A1 | 10/2017 | Schowengerdt et al. |
| 2017/0299784 A1 | 10/2017 | Mikkelsen et al. |
| 2017/0310907 A1 | 10/2017 | Wang |
| 2017/0322418 A1 | 11/2017 | Lin et al. |
| 2017/0329201 A1 | 11/2017 | Arnold |
| 2017/0374352 A1 | 12/2017 | Horesh |
| 2018/0035101 A1 | 2/2018 | Osterhout |
| 2018/0044234 A1 | 2/2018 | Hokansson et al. |
| 2018/0045953 A1 | 2/2018 | Fan et al. |
| 2018/0052276 A1 | 2/2018 | Klienman et al. |
| 2018/0052320 A1 | 2/2018 | Curtis et al. |
| 2018/0107015 A1 | 4/2018 | Dümpelmann et al. |
| 2018/0109002 A1 | 4/2018 | Foo |
| 2018/0129866 A1 | 5/2018 | Hicks et al. |
| 2018/0184065 A1 | 6/2018 | Zhao et al. |
| 2018/0216797 A1 | 8/2018 | Khorasaninejad et al. |
| 2018/0217395 A1 | 8/2018 | Lin et al. |
| 2018/0231700 A1 | 8/2018 | Ahmed et al. |
| 2018/0231702 A1 | 8/2018 | Lin et al. |
| 2018/0236596 A1 | 8/2018 | Ihlemann et al. |
| 2018/0246262 A1 | 8/2018 | Zhan et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0274750 A1 | 9/2018 | Byrnes et al. |
| 2018/0292644 A1 | 10/2018 | Kamali et al. |
| 2018/0299595 A1 | 10/2018 | Arbabi et al. |
| 2018/0314130 A1 | 11/2018 | Joo et al. |
| 2018/0341090 A1 | 11/2018 | Devlin et al. |
| 2018/0364158 A1 | 12/2018 | Wang et al. |
| 2019/0003892 A1 | 1/2019 | Aieta et al. |
| 2019/0025463 A1 | 1/2019 | She et al. |
| 2019/0025477 A1 | 1/2019 | She et al. |
| 2019/0041642 A1 | 2/2019 | Haddick et al. |
| 2019/0041660 A1 | 2/2019 | Ahmed |
| 2019/0041736 A1 | 2/2019 | Grunnet-jepsen et al. |
| 2019/0044003 A1 | 2/2019 | Heck et al. |
| 2019/0049632 A1 | 2/2019 | Shin et al. |
| 2019/0049732 A1 | 2/2019 | Lee et al. |
| 2019/0057512 A1 | 2/2019 | Han et al. |
| 2019/0064532 A1* | 2/2019 | Riley, Jr. ................. H01S 5/026 |
| 2019/0079321 A1 | 3/2019 | Wu et al. |
| 2019/0086579 A1 | 3/2019 | Kim et al. |
| 2019/0086683 A1 | 3/2019 | Aieta et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137075 A1 | 5/2019 | Aieta et al. |
| 2019/0137762 A1 | 5/2019 | Hu |
| 2019/0137793 A1 | 5/2019 | Luo et al. |
| 2019/0154877 A1 | 5/2019 | Capasso et al. |
| 2019/0155302 A1 | 5/2019 | Lukierski et al. |
| 2019/0157830 A1 | 5/2019 | Tong et al. |
| 2019/0162592 A1 | 5/2019 | Khorasaninejad et al. |
| 2019/0170655 A1 | 6/2019 | Smith |
| 2019/0191144 A1 | 6/2019 | Arbabi et al. |
| 2019/0196068 A1 | 6/2019 | Tsai et al. |
| 2019/0206136 A1 | 7/2019 | West et al. |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |
| 2019/0369401 A1 | 12/2019 | Rolland et al. |
| 2019/0377084 A1 | 12/2019 | Sleasman et al. |
| 2019/0386749 A1 | 12/2019 | Lezec et al. |
| 2019/0391378 A1 | 12/2019 | Eichelkraut et al. |
| 2020/0025888 A1 | 1/2020 | Jang et al. |
| 2020/0052027 A1 | 2/2020 | Arbabi et al. |
| 2020/0076163 A1 | 3/2020 | Han et al. |
| 2020/0083666 A1 | 3/2020 | Fallahi et al. |
| 2020/0096672 A1 | 3/2020 | Yu et al. |
| 2020/0150311 A1 | 5/2020 | Zhang et al. |
| 2020/0225386 A1 | 7/2020 | Tsai et al. |
| 2020/0236315 A1 | 7/2020 | Kimura |
| 2020/0249429 A1 | 8/2020 | Han et al. |
| 2020/0271941 A1 | 8/2020 | Riley, Jr. et al. |
| 2020/0272100 A1 | 8/2020 | Yu et al. |
| 2020/0284960 A1 | 9/2020 | Ellenbogen et al. |
| 2020/0355913 A1 | 11/2020 | Park et al. |
| 2021/0010928 A1 | 1/2021 | Acher et al. |
| 2021/0028215 A1 | 1/2021 | Devlin et al. |
| 2021/0048569 A1 | 2/2021 | Rubin et al. |
| 2021/0109364 A1 | 4/2021 | Aieta et al. |
| 2021/0112201 A1 | 4/2021 | Cho et al. |
| 2021/0149081 A1 | 5/2021 | Groever et al. |
| 2021/0190593 A1 | 6/2021 | Yao |
| 2021/0200992 A1 | 7/2021 | Padmanabhan et al. |
| 2021/0208469 A1 | 7/2021 | Didomenico |
| 2021/0231952 A1 | 7/2021 | Jamali et al. |
| 2021/0263329 A1 | 8/2021 | Latawiec |
| 2021/0286188 A1 | 9/2021 | Rubin et al. |
| 2021/0288095 A1 | 9/2021 | Delga et al. |
| 2021/0302763 A1 | 9/2021 | Yao et al. |
| 2021/0311588 A1 | 10/2021 | Han et al. |
| 2021/0318466 A1 | 10/2021 | Uenoyama et al. |
| 2021/0333150 A1 | 10/2021 | Mceldowney et al. |
| 2022/0050294 A1 | 2/2022 | Fermigier et al. |
| 2022/0052093 A1 | 2/2022 | Devlin et al. |
| 2022/0091428 A1 | 3/2022 | Riley, Jr. et al. |
| 2022/0107263 A1 | 4/2022 | Biesinger et al. |
| 2022/0206186 A1 | 6/2022 | Chen et al. |
| 2022/0206205 A1 | 6/2022 | Rubin et al. |
| 2022/0214219 A1 | 7/2022 | Faraon et al. |
| 2022/0244442 A1 | 8/2022 | Rubin et al. |
| 2022/0262087 A1 | 8/2022 | Zheludev et al. |
| 2022/0283411 A1 | 9/2022 | Devlin et al. |
| 2023/0194883 A1 | 6/2023 | Riley et al. |
| 2023/0196842 A1 | 6/2023 | Devlin et al. |
| 2023/0208104 A1 | 6/2023 | Tamagnone et al. |
| 2023/0280498 A1 | 9/2023 | Altuzarra et al. |
| 2023/0288716 A1 | 9/2023 | Rubin et al. |
| 2023/0314827 A1 | 10/2023 | Devlin et al. |
| 2023/0318261 A1 | 10/2023 | Tamagnone et al. |
| 2024/0142686 A1 | 5/2024 | Rubin et al. |
| 2024/0210246 A1* | 6/2024 | Rubin ................. G02B 5/3058 |
| 2024/0231118 A1* | 7/2024 | Hazineh ................. G01B 11/24 |
| 2024/0418907 A1* | 12/2024 | Hu ......................... G02B 1/002 |

FOREIGN PATENT DOCUMENTS

| | | |
|---|---|---|
| CA | 3064764 A1 | 11/2018 |
| CN | 1044991 A | 8/1990 |
| CN | 101158727 A | 4/2008 |
| CN | 101164147 A | 4/2008 |
| CN | 100476504 C | 4/2009 |
| CN | 101546002 A | 9/2009 |
| CN | 101681095 A | 3/2010 |
| CN | 101510013 B | 6/2010 |
| CN | 101510012 B | 8/2010 |
| CN | 101510011 B | 9/2010 |
| CN | 101241173 B | 8/2011 |
| CN | 202854395 U | 4/2013 |
| CN | 103092049 A | 5/2013 |
| CN | 203799117 U | 8/2014 |
| CN | 104067171 A | 9/2014 |
| CN | 104374745 A | 2/2015 |
| CN | 204422813 U | 6/2015 |
| CN | 104932043 A | 9/2015 |
| CN | 104956491 A | 9/2015 |
| CN | 204719330 U | 10/2015 |
| CN | 105068396 A | 11/2015 |
| CN | 103869484 B | 1/2016 |
| CN | 105223689 A | 1/2016 |
| CN | 105278026 A | 1/2016 |
| CN | 105278309 A | 1/2016 |
| CN | 105655286 A | 6/2016 |
| CN | 105676314 A | 6/2016 |
| CN | 105917277 A | 8/2016 |
| CN | 105974503 A | 9/2016 |

(56) References Cited

FOREIGN PATENT DOCUMENTS

| | | | |
|---|---|---|---|
| CN | 103257441 | B | 10/2016 |
| CN | 205620619 | U | 10/2016 |
| CN | 104834079 | B | 4/2017 |
| CN | 106611699 | A | 5/2017 |
| CN | 104834089 | B | 6/2017 |
| CN | 106848555 | A | 6/2017 |
| CN | 106200276 | B | 10/2017 |
| CN | 104834088 | B | 12/2017 |
| CN | 105676314 | B | 1/2018 |
| CN | 107561857 | A | 1/2018 |
| CN | 108089325 | A | 5/2018 |
| CN | 108291983 | A | 7/2018 |
| CN | 207623619 | U | 7/2018 |
| CN | 106199997 | B | 8/2018 |
| CN | 108474869 | A | 8/2018 |
| CN | 108507542 | A | 9/2018 |
| CN | 207923075 | U | 9/2018 |
| CN | 108680544 | A | 10/2018 |
| CN | 108761779 | A | 11/2018 |
| CN | 109000692 | A | 12/2018 |
| CN | 208270846 | U | 12/2018 |
| CN | 109196387 | A | 1/2019 |
| CN | 208421387 | U | 1/2019 |
| CN | 106199956 | B | 2/2019 |
| CN | 109360139 | A | 2/2019 |
| CN | 106950195 | B | 5/2019 |
| CN | 106324832 | B | 7/2019 |
| CN | 106526730 | B | 7/2019 |
| CN | 106485761 | B | 8/2019 |
| CN | 110160685 | A | 8/2019 |
| CN | 110678773 | A | 1/2020 |
| CN | 108474869 | B | 6/2020 |
| CN | 111316138 | A | 6/2020 |
| CN | 111580190 | A | 8/2020 |
| CN | 111656707 | A | 9/2020 |
| CN | 111819489 | A | 10/2020 |
| CN | 112285028 | A * | 1/2021 ............. G01N 21/21 |
| CN | 213092332 | U | 4/2021 |
| CN | 113050295 | A | 6/2021 |
| CN | 113168022 | A | 7/2021 |
| CN | 110376665 | B | 8/2021 |
| CN | 213902664 | U | 8/2021 |
| CN | 213903843 | U | 8/2021 |
| CN | 214098104 | U | 8/2021 |
| CN | 113703080 | A | 11/2021 |
| CN | 111580190 | B | 12/2021 |
| CN | 113791524 | A | 12/2021 |
| CN | 113807312 | A | 12/2021 |
| CN | 113820839 | A | 12/2021 |
| CN | 113834568 | A | 12/2021 |
| CN | 113835227 | A | 12/2021 |
| CN | 113851573 | A | 12/2021 |
| CN | 215005942 | U | 12/2021 |
| CN | 215010478 | U | 12/2021 |
| CN | 110494771 | B | 1/2022 |
| CN | 113885106 | A | 1/2022 |
| CN | 113889451 | A | 1/2022 |
| CN | 113900078 | A | 1/2022 |
| CN | 113900162 | A | 1/2022 |
| CN | 113906320 | A | 1/2022 |
| CN | 113917574 | A | 1/2022 |
| CN | 113917578 | A | 1/2022 |
| CN | 113934004 | A | 1/2022 |
| CN | 113934005 | A | 1/2022 |
| CN | 113959984 | A | 1/2022 |
| CN | 114002707 | A | 2/2022 |
| CN | 114019589 | A | 2/2022 |
| CN | 114047632 | A | 2/2022 |
| CN | 114047637 | A | 2/2022 |
| CN | 114112058 | A | 3/2022 |
| CN | 114156168 | A | 3/2022 |
| CN | 114176492 | A | 3/2022 |
| CN | 215932365 | U | 3/2022 |
| CN | 114280704 | A | 4/2022 |
| CN | 114280716 | A | 4/2022 |
| CN | 114286953 | A | 4/2022 |
| CN | 114296180 | A | 4/2022 |
| CN | 114325886 | A | 4/2022 |
| CN | 114326163 | A | 4/2022 |
| CN | 114354141 | A | 4/2022 |
| CN | 114373825 | A | 4/2022 |
| CN | 114384612 | A | 4/2022 |
| CN | 114397092 | A | 4/2022 |
| CN | 114397718 | A | 4/2022 |
| CN | 114415386 | A | 4/2022 |
| CN | 216345776 | U | 4/2022 |
| CN | 216351311 | U | 4/2022 |
| CN | 216351591 | U | 4/2022 |
| CN | 216355281 | U | 4/2022 |
| CN | 216361353 | U | 4/2022 |
| CN | 111316138 | B | 5/2022 |
| CN | 114488365 | A | 5/2022 |
| CN | 114543993 | A | 5/2022 |
| CN | 114545367 | A | 5/2022 |
| CN | 114545370 | A | 5/2022 |
| CN | 114554062 | A | 5/2022 |
| CN | 114561266 | A | 5/2022 |
| CN | 216593224 | U | 5/2022 |
| CN | 216605227 | U | 5/2022 |
| CN | 216622749 | U | 5/2022 |
| CN | 114578642 | A | 6/2022 |
| CN | 114593689 | A | 6/2022 |
| CN | 114623960 | A | 6/2022 |
| CN | 114624878 | A | 6/2022 |
| CN | 114660683 | A | 6/2022 |
| CN | 114660780 | A | 6/2022 |
| CN | 114690387 | A | 7/2022 |
| CN | 114740631 | A | 7/2022 |
| CN | 114743714 | A | 7/2022 |
| CN | 114779437 | U | 7/2022 |
| CN | 216896898 | U | 7/2022 |
| CN | 216900930 | U | 7/2022 |
| CN | 216901121 | U | 7/2022 |
| CN | 216901165 | U | 7/2022 |
| CN | 216901317 | U | 7/2022 |
| CN | 216901952 | U | 7/2022 |
| CN | 216903719 | U | 7/2022 |
| CN | 216933177 | U | 7/2022 |
| CN | 217034311 | U | 7/2022 |
| CN | 217034418 | U | 7/2022 |
| CN | 217034466 | U | 7/2022 |
| CN | 114859446 | A | 8/2022 |
| CN | 114859447 | A | 8/2022 |
| CN | 114859570 | A | 8/2022 |
| CN | 114935741 | A | 8/2022 |
| CN | 217276608 | U | 8/2022 |
| CN | 217278911 | U | 8/2022 |
| CN | 217278915 | U | 8/2022 |
| CN | 217278989 | U | 8/2022 |
| CN | 217279003 | U | 8/2022 |
| CN | 217279087 | U | 8/2022 |
| CN | 217279110 | U | 8/2022 |
| CN | 217279168 | U | 8/2022 |
| CN | 217279244 | U | 8/2022 |
| CN | 217280797 | U | 8/2022 |
| CN | 217280851 | U | 8/2022 |
| CN | 217281621 | U | 8/2022 |
| CN | 217281623 | U | 8/2022 |
| CN | 114995038 | A | 9/2022 |
| CN | 115016099 | A | 9/2022 |
| CN | 115016150 | A | 9/2022 |
| CN | 115032766 | A | 9/2022 |
| CN | 115047432 | A | 9/2022 |
| CN | 115047548 | A | 9/2022 |
| CN | 115047653 | A | 9/2022 |
| CN | 115061114 | A | 9/2022 |
| CN | 115079415 | A | 9/2022 |
| CN | 115113174 | A | 9/2022 |
| CN | 217456368 | U | 9/2022 |
| CN | 217465697 | U | 9/2022 |
| CN | 217466052 | U | 9/2022 |
| CN | 217466667 | U | 9/2022 |
| CN | 217467162 | U | 9/2022 |
| CN | 217467176 | U | 9/2022 |

(56) References Cited

FOREIGN PATENT DOCUMENTS

| CN | 217467177 U | 9/2022 |
|----|-------------|--------|
| CN | 217467226 U | 9/2022 |
| CN | 217467326 U | 9/2022 |
| CN | 217467327 U | 9/2022 |
| CN | 217467336 U | 9/2022 |
| CN | 217467338 U | 9/2022 |
| CN | 217467351 U | 9/2022 |
| CN | 217467352 U | 9/2022 |
| CN | 217467353 U | 9/2022 |
| CN | 217467355 U | 9/2022 |
| CN | 217467357 U | 9/2022 |
| CN | 217467358 U | 9/2022 |
| CN | 217467363 U | 9/2022 |
| CN | 217467364 U | 9/2022 |
| CN | 217467367 U | 9/2022 |
| CN | 217467368 U | 9/2022 |
| CN | 217467395 U | 9/2022 |
| CN | 217467396 U | 9/2022 |
| CN | 217467399 U | 9/2022 |
| CN | 217467439 U | 9/2022 |
| CN | 217467452 U | 9/2022 |
| CN | 115164714 A | 10/2022 |
| CN | 115166876 A | 10/2022 |
| CN | 115166958 A | 10/2022 |
| CN | 115185082 A | 10/2022 |
| CN | 115211799 A | 10/2022 |
| CN | 115236795 A | 10/2022 |
| CN | 217639515 U | 10/2022 |
| CN | 217639519 U | 10/2022 |
| CN | 217639539 U | 10/2022 |
| CN | 217639544 U | 10/2022 |
| CN | 217639611 U | 10/2022 |
| CN | 217639612 U | 10/2022 |
| CN | 217639613 U | 10/2022 |
| CN | 217639715 U | 10/2022 |
| CN | 217639718 U | 10/2022 |
| CN | 217639719 U | 10/2022 |
| CN | 217639720 U | 10/2022 |
| CN | 217639722 U | 10/2022 |
| CN | 217639723 U | 10/2022 |
| CN | 217639724 U | 10/2022 |
| CN | 217639725 U | 10/2022 |
| CN | 217639726 U | 10/2022 |
| CN | 217639763 U | 10/2022 |
| CN | 217639765 U | 10/2022 |
| CN | 217639767 U | 10/2022 |
| CN | 217639768 U | 10/2022 |
| CN | 217639769 U | 10/2022 |
| CN | 217639770 U | 10/2022 |
| CN | 217639771 U | 10/2022 |
| CN | 217639772 U | 10/2022 |
| CN | 217639773 U | 10/2022 |
| CN | 217639774 U | 10/2022 |
| CN | 217639776 U | 10/2022 |
| CN | 217639777 U | 10/2022 |
| CN | 217639778 U | 10/2022 |
| CN | 217639903 U | 10/2022 |
| CN | 217639920 U | 10/2022 |
| CN | 115268058 A | 11/2022 |
| CN | 115327865 A | 11/2022 |
| CN | 115332917 A | 11/2022 |
| CN | 115343795 A | 11/2022 |
| CN | 115390176 A | 11/2022 |
| CN | 217809433 U | 11/2022 |
| CN | 217818613 U | 11/2022 |
| CN | 217819022 U | 11/2022 |
| CN | 217820828 U | 11/2022 |
| CN | 217820829 U | 11/2022 |
| CN | 217820831 U | 11/2022 |
| CN | 217820834 U | 11/2022 |
| CN | 217820838 U | 11/2022 |
| CN | 217820839 U | 11/2022 |
| CN | 217820840 U | 11/2022 |
| CN | 217820943 U | 11/2022 |
| CN | 217820944 U | 11/2022 |
| CN | 217820945 U | 11/2022 |
| CN | 217820971 U | 11/2022 |
| CN | 217821058 U | 11/2022 |
| CN | 217821068 U | 11/2022 |
| CN | 217821071 U | 11/2022 |
| CN | 217821091 U | 11/2022 |
| CN | 217821110 U | 11/2022 |
| CN | 217821111 U | 11/2022 |
| CN | 217821113 U | 11/2022 |
| CN | 217821122 U | 11/2022 |
| CN | 217821160 U | 11/2022 |
| CN | 217821236 U | 11/2022 |
| CN | 217821680 U | 11/2022 |
| CN | 217821696 U | 11/2022 |
| CN | 217822825 U | 11/2022 |
| CN | 217823690 U | 11/2022 |
| CN | 217825178 U | 11/2022 |
| CN | 217885960 U | 11/2022 |
| CN | 217902220 U | 11/2022 |
| CN | 217902222 U | 11/2022 |
| CN | 115421295 A | 12/2022 |
| CN | 115453754 A | 12/2022 |
| CN | 115524768 A | 12/2022 |
| CN | 115524775 A | 12/2022 |
| CN | 115524874 A | 12/2022 |
| CN | 217981833 U | 12/2022 |
| CN | 217981857 U | 12/2022 |
| CN | 217981991 U | 12/2022 |
| CN | 217981992 U | 12/2022 |
| CN | 217982020 U | 12/2022 |
| CN | 217982038 U | 12/2022 |
| CN | 217982089 U | 12/2022 |
| CN | 217982120 U | 12/2022 |
| CN | 217983382 U | 12/2022 |
| CN | 217984044 U | 12/2022 |
| CN | 115812169 A | 3/2023 |
| CN | 116745685 A | 9/2023 |
| CN | 118295056 A | 7/2024 |
| DE | 102007058558 A1 | 6/2009 |
| DE | 102009037629 A1 | 2/2011 |
| DE | 102012212753 A1 | 1/2014 |
| DE | 102015221985 A1 | 5/2017 |
| DE | 102016218996 A1 | 9/2017 |
| DE | 112018002811 T5 | 2/2020 |
| DE | 112018002670 T5 | 3/2020 |
| EP | 1251397 A2 | 10/2002 |
| EP | 1252623 B1 | 10/2004 |
| EP | 2631740 A2 | 8/2013 |
| EP | 2763519 A2 | 8/2014 |
| EP | 2884247 A1 | 6/2015 |
| EP | 2338114 B1 | 3/2017 |
| EP | 3226042 A1 | 10/2017 |
| EP | 3353578 A1 | 8/2018 |
| EP | 3380876 A1 | 10/2018 |
| EP | 3385770 A1 | 10/2018 |
| EP | 3440484 A1 | 2/2019 |
| EP | 3504566 A2 | 7/2019 |
| EP | 3631533 A1 | 4/2020 |
| EP | 3676973 A1 | 7/2020 |
| EP | 3743764 A1 | 12/2020 |
| EP | 3353578 B1 | 1/2021 |
| EP | 3799626 A1 | 4/2021 |
| EP | 3956702 A1 | 2/2022 |
| EP | 4004608 A1 | 6/2022 |
| EP | 4147311 A1 | 3/2023 |
| EP | 4268009 A1 | 11/2023 |
| GB | 2123238 A | 1/1984 |
| GB | 2490895 A | 11/2012 |
| GB | 2499869 B | 3/2018 |
| GB | 2578049 A | 4/2020 |
| GB | 2578233 A | 4/2020 |
| GB | 2578236 A | 4/2020 |
| GB | 2578236 B | 11/2022 |
| HK | 40010538 | 7/2020 |
| JP | 2004302457 A | 10/2004 |
| JP | 2005017408 A | 1/2005 |
| JP | 2005274847 A | 10/2005 |
| JP | 2008046428 A | 2/2008 |
| JP | 2008299084 A | 12/2008 |

(56) References Cited

FOREIGN PATENT DOCUMENTS

| | | | |
|---|---|---|---|
| JP | 2010085977 A | 4/2010 |
| JP | 2015502581 A | 1/2015 |
| JP | 2015092234 A | 5/2015 |
| JP | 2016511936 A | 4/2016 |
| JP | 2017062373 A | 3/2017 |
| JP | 2018536204 A | 12/2018 |
| JP | 2018537804 A | 12/2018 |
| JP | 2019516128 A | 6/2019 |
| JP | 2020522009 A | 7/2020 |
| JP | 2021511553 A | 5/2021 |
| JP | 6925358 B2 | 8/2021 |
| JP | 2022542172 A | 9/2022 |
| KR | 0144569 B1 | 11/1998 |
| KR | 20080099452 A | 11/2008 |
| KR | 20080103149 A | 11/2008 |
| KR | 20090002583 A | 1/2009 |
| KR | 20100027995 A | 3/2010 |
| KR | 101493928 B1 | 3/2015 |
| KR | 20150113041 A | 10/2015 |
| KR | 20170015109 A | 2/2017 |
| KR | 20180083885 A | 7/2018 |
| KR | 20180121309 A | 11/2018 |
| KR | 20180124106 A | 11/2018 |
| KR | 101905444 B1 | 12/2018 |
| KR | 20190038221 A | 4/2019 |
| KR | 102036640 B1 | 10/2019 |
| KR | 1020200008630 A | 1/2020 |
| KR | 1020200108901 A | 9/2020 |
| KR | 20210088520 A | 7/2021 |
| KR | 102363805 B1 | 2/2022 |
| KR | 1020220035971 A | 3/2022 |
| KR | 102763012 B1 | 1/2025 |
| SG | 11201804346P A | 6/2018 |
| SG | 11201808772W A | 11/2018 |
| SG | 11201804346P B | 11/2021 |
| SG | 11201808772W B | 11/2021 |
| SG | 11202001717V | 2/2023 |
| SG | 11202006952X | 2/2023 |
| TW | 201017338 A | 5/2010 |
| TW | 201438242 A | 10/2014 |
| TW | 201908232 A | 3/2019 |
| WO | 0043750 A2 | 7/2000 |
| WO | 2007141788 A2 | 12/2007 |
| WO | 2008019803 A1 | 2/2008 |
| WO | 2008020899 A2 | 2/2008 |
| WO | 2009067540 A1 | 5/2009 |
| WO | 2009124181 A2 | 10/2009 |
| WO | 2011106553 A2 | 9/2011 |
| WO | 2011106553 A3 | 1/2012 |
| WO | 2012122677 A1 | 9/2012 |
| WO | 2012139634 A1 | 10/2012 |
| WO | 2012144997 A1 | 10/2012 |
| WO | 2012172366 A1 | 12/2012 |
| WO | 2013033591 A3 | 3/2013 |
| WO | 2014116500 A1 | 7/2014 |
| WO | 2015021255 A1 | 2/2015 |
| WO | 2015077926 A1 | 6/2015 |
| WO | 2015112939 A1 | 7/2015 |
| WO | 2015160412 A2 | 10/2015 |
| WO | 2016049629 A1 | 3/2016 |
| WO | 2016051325 A1 | 4/2016 |
| WO | 2016086204 A1 | 6/2016 |
| WO | 2016140720 A2 | 9/2016 |
| WO | 2016140720 A3 | 10/2016 |
| WO | 2016168173 A1 | 10/2016 |
| WO | 2016178740 A2 | 11/2016 |
| WO | 2016191142 A2 | 12/2016 |
| WO | 2017005709 A1 | 1/2017 |
| WO | 2017034995 A1 | 3/2017 |
| WO | 2017040854 A1 | 3/2017 |
| WO | 2017053309 A1 | 3/2017 |
| WO | 2017079480 A1 | 5/2017 |
| WO | 2017091738 A1 | 6/2017 |
| WO | 2017176921 A1 | 10/2017 |
| WO | 2017182771 A1 | 10/2017 |
| WO | 2018063455 A1 | 4/2018 |
| WO | 2018067246 A2 | 4/2018 |
| WO | 2018063455 A9 | 5/2018 |
| WO | 2018118984 A1 | 6/2018 |
| WO | 2018134215 A1 | 7/2018 |
| WO | 2018067246 A3 | 8/2018 |
| WO | 2018142339 A1 | 8/2018 |
| WO | 2018204856 A1 | 11/2018 |
| WO | 2018218063 A1 | 11/2018 |
| WO | 2018219710 A1 | 12/2018 |
| WO | 2018222944 A1 | 12/2018 |
| WO | 2019015735 A1 | 1/2019 |
| WO | 2019039241 A1 | 2/2019 |
| WO | 2019043016 A1 | 3/2019 |
| WO | 2019046827 A1 | 3/2019 |
| WO | 2019057907 A1 | 3/2019 |
| WO | 2019075335 A1 | 4/2019 |
| WO | 2019101750 A2 | 5/2019 |
| WO | 2019103762 A2 | 5/2019 |
| WO | 2019108290 A1 | 6/2019 |
| WO | 2019113106 A1 | 6/2019 |
| WO | 2019116364 A1 | 6/2019 |
| WO | 2019118646 A1 | 6/2019 |
| WO | 2019119025 A1 | 6/2019 |
| WO | 2019103762 A3 | 7/2019 |
| WO | 2019136166 A1 | 7/2019 |
| WO | 2019103762 A9 | 8/2019 |
| WO | 2019147828 A1 | 8/2019 |
| WO | 2019148200 A1 | 8/2019 |
| WO | 2019164542 A1 | 8/2019 |
| WO | 2019164849 A1 | 8/2019 |
| WO | 2019173357 A1 | 9/2019 |
| WO | 2019198568 A1 | 10/2019 |
| WO | 2019203876 A2 | 10/2019 |
| WO | 2019204667 A1 | 10/2019 |
| WO | 2019206430 A1 | 10/2019 |
| WO | 2020001938 A1 | 1/2020 |
| WO | 2020010084 A1 | 1/2020 |
| WO | 2020101568 A1 | 5/2020 |
| WO | 2020139752 A1 | 7/2020 |
| WO | 2020176227 A1 | 9/2020 |
| WO | 2020214615 A1 | 10/2020 |
| WO | 2020214617 A1 | 10/2020 |
| WO | 2020248046 A1 | 12/2020 |
| WO | 2021021671 A1 | 2/2021 |
| WO | 2021076154 A1 | 4/2021 |
| WO | 2021130085 A1 | 7/2021 |
| WO | 2021226544 A1 | 11/2021 |
| WO | 2021230868 A1 | 11/2021 |
| WO | 2022146929 A1 | 7/2022 |
| WO | 2022150816 A1 | 7/2022 |
| WO | 2023115037 A1 | 6/2023 |
| WO | 2024077086 A1 | 4/2024 |

OTHER PUBLICATIONS

Qi et al. Real time complete Stokes polarimetric imager based on a linear polarizer array camera for tissue polarimetric imaging (Year: 2017).*

Yanagisawa et al. A low-dispersion spectral video camera for observing lunar impact flashes (Year: 2022).*

Jon: What is a lens optical format? Can I use any machine vision camera with any format? NOT! (Year: 2017).*

Novikova et al., "Polarimetric Imaging for Cancer Diagnosis and Staging", Optics and Photonics News, Oct. 2012, 8 pgs.

Oh et al., "Achromatic Diffraction from Polarization Gratings with High Efficiency", Optic Letters, vol. 33, No. 20, Oct. 15, 2008, pp. 2287-2289.

Okaya et al., "The Dielectric Microwave Resonator", Proceedings of the IRE, Oct. 1962, pp. 2081-2092, doi: 10.1109/JRPROC.1962. 288245.

Orazbayev et al., "Tunable Beam Steering Enabled by Graphene Metamaterials", Optics Express, vol. 24, No. 8, Apr. 18, 2016, pp. 8848-8861, doi: 10.1364/OE.24.008848.

Otten et al., "Vector Apodizing Phase Plate Coronagraph: Prototyping, Characterization and Outlook", Advances in Optical and Mechanical.

(56) References Cited

OTHER PUBLICATIONS

Technologies for Telescopes and Instrumentation, Proceedings of SPIE, vol. 9151, 2014, pp. 91511R-1-91511R-10.

Pacheco-Peña et al., "Epsilon-Near-Zero Metalenses Operating in the Visible", Optics & Laser Technology, 2016, pp. 1-18.

Peinado et al., "Optimization and Performance Criteria of a Stokes Polarimeter Based on Two Variable Retarders", Optics Express, vol. 18, No. 10, May 10, 2010, pp. 9815-9530.

Petosa et al., "An Overview of Tuning Techniques for Frequency-Agile Antennas", IEEE Antennas and Propagation Magazine, vol. 54, No. 5, Oct. 2012, pp. 271-296.

Pfeiffer et al., "Cascaded Metasurfaces for Complete Phase and Polarization Control", Applied Physics Letters, vol. 102, Jun. 11, 2013, pp. 231116-1-231116-4, doi: 10.1063/1.4810873.

Pfeiffer et al., "Metamaterial Huygens' Surface: Tailoring Wave Fronts with Reflectionless Sheets", Physical Review Letters, vol. 110, May 10, 2013, pp. 197401-1-197401-5, DOI: 10.1103/PhysRevLett.110.197401.

Pierangelo et al., "Polarimetric Imaging of Uterine Cervix: A Case Study", Optics Express, vol. 21, No. 12, Jun. 17, 2013, pp. 14120-14130.

Pors et al., "Broadband Focusing Flat Mirrors Based on Plasmonic Gradient Metasurfaces", Nano Letters, vol. 13, Jan. 23, 2013, pp. 829-834, doi: https://doi.org/10.1021/nl304761m.

Pors et al., "Plasmonic Metagratings for Simultaneous Determination of Stokes Parameters", Optica, vol. 2, No. 8, Aug. 2015, pp. 716-723.

Pors et al., "Plasmonic Metagratings for Simultaneous Determination of Strokes Parameters", Arxiv:1609.04691v1 [physics.optics], Sep. 15, 2016, 21 pgs., doi: http://dx.doi.org/10.1364/OPTICA.2.000716.

Pors et al., "Waveguide Metacouplers for In-Plane Polarimetry", Physical Review Applied, vol. 5, 2016, pp. 064015-1-064015-9.

Ramos et al., "Error Propagation in Polarimetric Demodulation", Applied Optics, vol. 47, No. 14, May 10, 2008, pp. 2541-2549.

Redding et al., "Full-Field Interferometric Confocal Microscopy Using a VCSEL Array", Optics Letters, vol. 39, No. 15, Aug. 1, 2014, 11 pgs.

Reichelt et al., "Capabilities of Diffractive Optical Elements for Real-Time Holographic Displays", Proceedings of SPIE, vol. 6912, Feb. 2008, pp. 69120-69130, doi: 10.1117/12.762887.

Romero et al., "Theory of Optimal Beam Splitting by Phase Gratings. II. Square and Hexagonal Gratings", Journal of the Optical Society of America A, vol. 24, No. 8, Aug. 2007, pp. 2296-2312.

Rosales-Guzman et al., "How to Shape Light with Spatial Light Modulators", SPIE, 2017, 58 pgs.

Roy et al., "Sub-Wavelength Focusing Meta-Lens", Optics Express, vol. 21, No. 6, Mar. 25, 2013, pp. 7577-7582.

Rubin et al., "Imaging polarimetry through metasurface polarization gratings", Optics Express vol. 30, No. 6, Mar. 8, 2022, [retrieved on Jan. 29, 2024] Retrieved from: <URL: https://opg.optica.org/OE/fulltext.cfm?uri=OE-30-6-9389&id=470165> entire document, pp. 9389-9412.

Rubin et al., "Matrix Fourier Optics Enables a Compact Full-Stokes Polarization Camera", Science, vol. 365, No. 43, Jul. 5, 2019, pp. 1-10, doi: 10.1126/science.aax1839.

Rubin et al., "Polarization State Generation and Measurement with A Single Metasurface", Optics Express, vol. 26, No. 17, Aug. 20, 2018, pp. 21455-21478, doi: 10.1364/OE.26.021455.

Sabatke et al., "Optimization of Retardance for a Complete Stokes Polarimeter", Optics Letters, vol. 25, No. 11, Jun. 1, 2000, pp. 802-804.

Saeidi et al., "Wideband Plasmonic Focusing Metasurfaces", Applied Physics Letters, vol. 105, Aug. 2014, pp. 053107-1-053107-4, doi: http://dx.doi.org/10.1063/1.4892560.

Sales et al., "Diffractive-Refractive Behavior of Kinoform Lenses", Applied Optics, vol. 36, No. 1, Jan. 1, 1997, pp. 253-257, doi: 10.1364/AO.36.000253.

Sancho-Parramon et al., "Optical Characterization of HfO2 by Spectroscopic Ellipsometry: Dispersion Models and Direct Data Inversion", Thin Solid Films, vol. 516, 2008, pp. 7990-7995, doi: 10.1016/j.tsf.2008.04.007.

Sayyah et al., "Two-Dimensional Pseudo-Random Optical Phased Array Based on Tandem Optical Injection Locking of Vertical Cavity Surface Emitting Lasers", Optics Express, vol. 23, No. 15, Jul. 27, 2015, pp. 19405-19416, doi: 10.1364/OE.23.019405.

Schulz et al., "Quantifying the Impact of Proximity Error Correction on Plasmonic Metasurfaces", Optical Materials Express, vol. 5, No. 12, Dec. 1, 2015, pp. 2798-2803, doi: 10.1364/OME.5.002798.

Sell et al., "Periodic Dielectric Metasurfaces with High-Efficiency, Multiwavelength Functionalities", Advanced Optical Materials, 2017, 7 pgs., doi: 10.1002/adom.201700645.

Seurin et al., "High-Efficiency VCSEL Arrays for Illumination and Sensing in Consumer Applications", Proceedings of SPIE, vol. 9766, 2016, pp. 97660D-1-97660D-9, doi: 10.1117/12.2213295.

She et al., "Large Area Metalenses: Design, Characterization, and Mass Manufacturing", Optics Express, vol. 26, No. 2, Jan. 22, 2018, pp. 1573-1585, doi: 10.1364/OE.26.001573.

Shi et al., "Continuous Angle-Tunable Birefringence with Freeform Metasurfaces for Arbitrary Polarization Conversion", Science Advances, vol. 6, No. eaba3367, Jun. 3, 2020, pp. 1-7, doi: 10.1126/sciadv.aba3367.

Shim et al., "Hard-Tip, Soft-Spring Lithography", Nature, vol. 469, Jan. 27, 2011, pp. 516-521.

Silvestri et al., "Robust Design Procedure for Dielectric Resonator Metasurface Lens Array", Optics Express, vol. 24, No. 25, Dec. 12, 2016, pp. 29153-29169.

Snik et al., "An Overview of Polarimetric Sensing Techniques and Technology with Applications to Different Research Fields", Proceedings of SPIE, vol. 9099, 2014, pp. 90990B-1-90990B-20.

Sokolov, A. L., "Polarization of Spherical Waves", Optics and Spectroscopy, vol. 92, No. 6, 2002, pp. 936-942.

Song et al., "Vividly-Colored Silicon Metasurface Based on Collective Electric and Magnetic Resonances", IEEE, Jan. 11, 2016, 2 pgs.

Sreelal et al., "Jones Matrix Microscopy from a Single-Shot Intensity Measurement", Optics Letters, vol. 42, Issue 24, Dec. 15, 2017, pp. 5194-5197.

Stenflo, J. O., "Chapter 13: Instrumentation for Solar Polarimetry", Solar Magnetic Fields: Polarized Radiation Diagnostics, Springer Netherlands, Dordrecht, 1994, pp. 312-350.

Su et al., "Designing LED Array for Uniform Illumination Distribution by Simulated Annealing Algorithm", Optics Express, vol. 20, No. S6, Nov. 5, 2012, pp. A843-A855.

Sun et al., "High-Efficiency Broadband Anomalous Reflection by Gradient Meta-Surfaces", Nano Letters, vol. 12, Nov. 28, 2012, pp. 6223-6229, doi: dx.doi.org/10.1021/nl3032668.

Tervo et al., "Paraxial-Domain Diffractive Elements with 100% Efficiency Based on Polarization Gratings", Optics Letters, vol. 25, No. 11, Jun. 1, 2000, pp. 785-786.

Todorov et al., "Polarization Holography. 1: A New High-Efficiency Organic Material with Reversible Photoinduced Birefringence", Applied Optics, vol. 23, No. 23, Dec. 1, 1984, pp. 4309-4312.

Todorov et al., "Spectrophotopolarimeter: Fast Simultaneous Real-Time Measurement of Light Parameters", Optics Letters, vol. 17, Mar. 1, 1992, pp. 358-359.

Trebino et al., "The Autocorrelation, the Spectrum, and Phase Retrieval", Frequency-Resolved Optical Gating: The Measurement of Ultrashort Laser Pulses, Springer, 2000, pp. 61-99.

Tyo, Scott J., "Noise Equalization in Stokes Parameter Images Obtained by Use of Variable-Retardance Polarimeters", Optics Letters, vol. 25, No. 16. Aug. 15, 2000, pp. 1198-1200.

International Search Report and Written Opinion for International Application No. PCT/US2008/084068, Search completed Jan. 13, 2009, Mailed Feb. 2, 2009, 6 pgs.

International Search Report and Written Opinion for International Application No. PCT/US2012/053434, Search completed Oct. 17, 2012, Mailed Dec. 17, 2012, 7 pgs.

International Search Report and Written Opinion for International Application No. PCT/US2015/064930, Search completed Sep. 9, 2016, Mailed Sep. 20, 2016, 11 pgs.

(56) References Cited

OTHER PUBLICATIONS

International Search Report and Written Opinion for International Application No. PCT/US2016/052685, Search completed Nov. 30, 2016, Mailed Dec. 9, 2016, 12 pgs.

International Search Report and Written Opinion for International Application No. PCT/US2016/063617, Search completed Jan. 19, 2017, Mailed Mar. 31, 2017, 9 pgs.

International Search Report and Written Opinion for International Application No. PCT/US2017/026206, Search completed Jun. 10, 2017, Mailed Jun. 28, 2017, 15 pgs.

International Search Report and Written Opinion for International Application No. PCT/US2017/036897, Search completed Jan. 31, 2018, Mailed Feb. 21, 2018, 9 pgs.

International Search Report and Written Opinion for International Application No. PCT/US2017/048469, Search completed Apr. 20, 2018, Mailed May 4, 2018, 9 pgs.

International Search Report and Written Opinion for International Application No. PCT/US2018/031204, Search completed Jun. 29, 2018, Mailed Jul. 23, 2018, 14 pgs.

International Search Report and Written Opinion for International Application No. PCT/US2018/034460, Search completed Jul. 29, 2018, Mailed Aug. 24, 2018, 10 pgs.

International Search Report and Written Opinion for International Application No. PCT/US2018/035502, Search completed Jul. 31, 2018, Mailed Aug. 24, 2018, 13 pgs.

International Search Report and Written Opinion for International Application No. PCT/US2018/038357, Search completed Apr. 9, 2019, Mailed May 13, 2019, 12 pgs.

International Search Report and Written Opinion for International Application No. PCT/US2018/046947, Search completed Oct. 14, 2019, Mailed Oct. 25, 2019, 10 pgs.

International Search Report and Written Opinion for International Application No. PCT/US2018/049276, Search completed Oct. 26, 2018, Mailed Jan. 15, 2019, 12 pgs.

International Search Report and Written Opinion for International Application No. PCT/US2019/014975, Search completed Jun. 17, 2019, Mailed Jul. 8, 2019, 10 pgs.

International Search Report and Written Opinion for International Application No. PCT/US2019/018615, Search completed Apr. 12, 2019, Mailed May 6, 2019, 12 pgs.

International Search Report and Written Opinion for International Application No. PCT/US2019/040302, Search completed Aug. 29, 2019, Mailed Oct. 17, 2019, 6 pgs.

International Search Report and Written Opinion for International Application No. PCT/US2020/028157, Search completed Jun. 16, 2020, Mailed Sep. 4, 2020, 9 pgs.

International Search Report and Written Opinion for International Application No. PCT/US2020/028159, Search completed Jun. 15, 2020, Mailed Aug. 11, 2020, 7 pgs.

International Search Report and Written Opinion for International Application No. PCT/US2020/043600, Search completed Sep. 29, 2020, Mailed Nov. 24, 2020, 11 pgs.

International Search Report and Written Opinion for International Application No. PCT/US2021/031423, Search completed Jul. 15, 2021, Mailed Aug. 16, 2021, 7 pgs.

International Search Report and Written Opinion for International Application No. PCT/US2021/065231, Search completed Apr. 19, 2022, Mailed May 13, 2022, 14 pgs.

International Search Report and Written Opinion for International Application No. PCT/US2022/038059, Search completed Sep. 27, 2022, Mailed Oct. 27, 2022, 17 pgs.

International Search Report and Written Opinion for International Application No. PCT/US2022/070043, Search completed May 5, 2022, Mailed Jun. 9, 2022, 16 pgs.

International Search Report and Written Opinion for International Application No. PCT/US2022/081868, Search completed Mar. 23, 2023, Mailed Apr. 4, 2023, 13 pgs.

Non-Final Office Action for U.S. Appl. No. 15/778,208, issued Jul. 14, 2021, 11 pgs.

Partial European Search Report for European Application No. 19744012.6, Search completed Sep. 3, 2021, Mailed Sep. 15, 2021, 12 Pgs.

Search Report and Written Opinion for Singapore Patent Application No. SG11201808772W, Search completed Jan. 20, 2020, Mailed Jan. 28, 2020, 12 pgs.

Supplementary Partial European Search Report for European Application No. 16869282.0, Search completed Jun. 19, 2019, Mailed Jul. 2, 2019, 12 pgs.

"Elliptical Polarization", Wikipedia, XP055893535, Jan. 11, 2022, retrieved from the Internet URL: <https://en.wikipedia.org/wiki/Elliptical_polarization>, retrieved on Feb. 18, 2022, 4 pgs.

Buralli et al., "Optical Performance of Holographic Kinoforms", Applied Optics, vol. 28, No. 5, Mar. 1, 1989, pp. 976-983, doi: 10.1364/AO.28.000976.

Byrnes et al., "Designing Large, High-Efficiency, High-Numerical-Aperture, Transmissive Meta-Lenses for Visible Light", Optics Express, Mar. 7, 2016, vol. 24, No. 5, pp. 5110-5124, doi: 10.1364/OE.24.005110.

Campione et al., "Tailoring Dielectric Resonator Geometrics for Directional Scattering and Huygens' Metasurfaces", Optics Express, vol. 23, No. 3, Feb. 9, 2015, pp. 2293-2307, doi: 10.1364/OE.23.002293.

Capaldo et al., "Nano-Fabrication and Characterization of Silicon Meta-Surfaces Provided with Pancharatnam-Berry effect", Optical Materials Express, vol. 9, No. 3, Mar. 1, 2019, pp. 1015-1032.

Chen et al., "A Broadband Achromatic Metalens for Focusing and Imaging in the Visible", Nature Nanotechnology, 2018, 8 pgs., doi: 10.1038/s41565-017-0034-6.

Chen et al., "A Review of Metasurfaces: Physics and Applications", Reports on Progress in Physics, vol. 79, No. 076401, Jun. 16, 2016, 40 pgs., doi: 10.1088/0034-4885/79/7/076401.

Chen et al., "Broadband Achromatic Metasurface-Refractive Optics", Nano Letters, vol. 18, Nov. 13, 2018, pp. 7801-7808.

Chen et al., "Dual-Polarity Plasmonic Metalens for Visible Light", Nature Communications, vol. 3, No. 1198, Nov. 13, 2012, pp. 1-6, doi: 10.10388/ncomms2207.

Chen et al., "Engineering the Phase Front of Light with Phase-Change Material Based Planar Lenses", Scientific Reports, vol. 5, No. 8660, Mar. 2, 2015, pp. 1-7.

Chen et al., "High-Efficiency Broadband Meta-Hologram with Polarization-Controlled Dual Images", Nano Letters, 2013, pp. A-F, doi: dx.doi.org.10.1021/nl403811d.

Chen et al., "Immersion Meta-Lenses at Visible Wavelengths for Nanoscale Imaging", Nano Letters, Apr. 7, 2017, pp. A-G, doi: 10.1021/acs.nanolett.7b00717.

Chen et al., "Integrated Plasmonic Metasurfaces for Spectropolarimetry", Nanotechnology, vol. 27, Apr. 26, 2016, pp. 1-7, doi:10.1088/0957-4484/27/22/224002.

Chen et al., "Phase and Dispersion Engineering of Metalenses: Broadband Achromatic Focusing and Imaging in the Visible", Arxiv, 2017, retrieved from the Internet: URL: https://arxiv.org/abs/1711.09343v1>, 30 pgs.

Chen et al., "Supplementary Information of Engineering the Phase Front of Light with Phase-Change Material Based Planar Lenses", Scientific Reports, 2015, 4 pgs.

Chipman et al., "Polarized Light and Optical Systems", CRC Press, 2019, 106 pgs.

Chou et al., "Imprint Lithography with 25-Nanometer Resolution", Science, vol. 272, Apr. 5, 1996, pp. 85-87.

Chou et al., "Subwavelength Amorphous Silicon Transmission Gratings and Applications in Polarizers and Waveplates", Applied Physics Letters, vol. 67, No. 6, Aug. 7, 1995, pp. 742-744.

Cincotti, "Polarization Gratings: Design and Applications", IEEE Journal of Quantum Electronics, vol. 39, 2003, pp. 1645-1652.

Cloude, Shane, "Conditions for the Physical Realisability of Matrix Operators in Polarimetry", Proceedings of SPIE, vol. 1166, 1989, pp. 177-185, doi: 10.1117/12.962889.

Cofre et al., "Quantitative performance of a polarization diffraction grating polarimeter encoded onto two liquid-crystal-on-silicon displays", Optics & Laser Technology, vol. 96, 2017, pp. 219-226.

(56)  References Cited

OTHER PUBLICATIONS

Cui et al., "Sixteen-Beam Grating-Based Division-of-Amplitude Photopolarimeter", Optics Letters, vol. 21, No. 1, Jan. 1, 1996, pp. 89-91.

Cumme et al., "From Regular Periodic Micro-Lens Arrays to Randomized Continuous Phase Profiles", Advanced Optical Technologies, 2015, vol. 4, No. 1, pp. 47-61. DOI 10.1515/aot-2014-0062.

Damask, "Polarization Optics in Telecommunications", Springer, 2005, 535 pgs.

Davis et al., "Diffraction Gratings Generating Orders with Selective States of Polarization", Optics Express, vol. 24, No. 2, 2016, pp. 907-917, doi: 10.1364/OE.24.000907.

Davis et al., "Polarization Beam Splitters Using Polarization Diffraction Gratings", Optics Letters, vol. 26, No. 9, May 1, 2001, pp. 587-589.

Dayal et al., "Polarization Control of 0.85 μm Vertical-cavity Surface-Emitting Lasers Integrated with Gold Nanorod Arrays", Applied Physics Letters, vol. 91, Sep. 12, 2007, pp. 111107-1-111107-3, doi: 10.1063/1.2783281.

Decker et al., "High-Efficiency Light-Wave Control with All-Dielectric Optical Huygens' Metasurfaces", Advanced Optical Materials, arXiv:1405.5038, 2014, 17 pgs., doi: 10.1002/adom.201400584.

Deng et al., "Diatomic Metasurface for Vectorial Holography", Nano Letters, Mar. 28, 2018, pp. A-H.

Liu et al., "Single-Pixel Computational Ghost Imaging with Helicity-Dependent Metasurface Hologram", Science Advances, vol. 3, No. E1701477, Sep. 8, 2017, pp. 1-6.

Liu et al., "SSD: Single Shot Multibox Detector", European Conference on Computer Vision, Springer, 2016, pp. 21-37, doi: 10.1007/978-3-319-46448-0_2.

Lizana et al., "Arbitrary State of Polarization with Customized Degree of Polarization Generator", Optics Letters, vol. 40, No. 16, Aug. 15, 2015, pp. 3790-3793.

Lo et al., "New Architecture for Space Telescopes Uses Fresnel Lenses", SPIE Newsroom, 2006, 2 pgs., doi: 10.1117/2.1200608.0333.

Lohmann, A. W., "Reconstruction of Vectorial Wavefronts", Applied Optics, vol. 4, No. 12, 1965, pp. 1667-1668.

Lu et al., "Homogeneous and Inhomogeneous Jones Matrices", Journal of the Optical Society of America A, 1994, vol. 11, No. 2, pp. 766-773.

Lu et al., "Interpretation of Mueller Matrices Based on Polar Decomposition", Journal of the Optical Society of America A, vol. 13, No. 5, May 1996, pp. 1106-1113.

Lu et al., "Planar High-Numerical-Aperture Low-Loss Focusing Reflectors and Lenses Using Subwavelength High Contrast Gratings", Optics Express, vol. 18, No. 12, Jun. 7, 2010, pp. 12606-12614, doi: 10.1364/OE.18.012606.

Luk et al., "Dielectric Resonator Antennas", Research Studies Press Ltd., Hertfordshire, 2003, 404 pgs. (presented in 2 parts).

Mackus et al., "The Use of Atomic Layer Deposition in Advanced Nanopatterning", Nanoscale, vol. 6, Jul. 25, 2014, pp. 10941-10960.

Maguid et al., "Multifunctional Interleaved Geometric-Phase Dielectric Metasurfaces", Light: Science & Applications, vol. 6, No. E17027, Aug. 11, 2017, pp. 1-7, doi: 10.1038/lsa.2017.27.

Maguid et al., "Photonic Spin-Controlled Multifunctional Shared-Aperture Antenna Array", Science, vol. 352, No. 6290, Apr. 21, 2016, pp. 1202-1206.

Mao et al., "Nanopatterning Using a Simple Bi-Layer Lift-Off Process for the Fabrication of a Photonic Crystal Nanostructure", Nanotechnology, vol. 24, No. 085302, Feb. 1, 2013, pp. 1-6, doi: 10.1088/0957-4484/24/8/085302.

Mao et al., "Surface Patterning of Nonscattering Phosphors for Light Extraction", Optics Letters, vol. 38, No. 15, Aug. 1, 2013, pp. 2796-2799, doi: 10.1364/OL.38.002796.

Martin-Moreno, L., "Theory of Highly Directional Emission from a Single Subwavelength Aperture Surrounded by Surface Corruga-tions", Physical Review Letters, vol. 90, No. 16, Apr. 25, 2003, pp. 167401-1-167401-4, doi: 10.1103/PnysRevLett.9.167401.

Martin-Regalado et al., "Polarization Properties of Vertical-Cavity Surface-Emitting Lasers", IEEE Journal of Quantum Electronics, May 1997, vol. 33, No. 5, pp. 765-783, doi: 10.1109/3.572151.

Mcleod, J., "Thin-Film Optical Filters", Third Edition, Institute of Physics Publishing, Adam Hilger, 1986, 667 pgs., (presented in 2 parts).

Meng et al., "A Novel Nanofabrication Technique of Silicon-Based Nanostructures", Nanoscale Research Letters, vol. 11, No. 504, pp. 1-9, doi:10.1186/s11671-016-1702-4.

Menzel et al., "Advanced Jones Calculus for the Classification of Periodic Metamaterials", Physical Review A, vol. 82, Nov. 15, 2010, pp. 053811-1-053811-9, doi: 10.1103/PhysRevA.82.053811.

Miyazaki et al., "Ultraviolet-Nanoimprinted Packaged Metasurface Thermal Emitters for Infrared CO2 Sensing", Science and Technology of Advanced Materials, vol. 16, No. 035005, May 20, 2015, pp. 1-5, doi: 10.1088/1468-6996/16/3/035005.

Monticone et al., "Full Control of Nanoscale Optical Transmission with a Composite Metascreen", Physical Review Letters, vol. 110, May 17, 2013, pp. 203903-1-203903-5, doi: 10.1103/PhysRevLett.110.203903.

Moreno et al., "Jones Matrix Treatment for Optical Fourier Processors with Structured Polarization", Optics Express, vol. 19, No. 5, Feb. 28, 2011, pp. 4583-4594.

Moreno et al., "Jones matrix treatment for polarization Fourier optics", Journal of Modern Optics, vol. 51, No. 14, Mar. 26, 2004, pp. 2031-2038.

Mueller et al., "Metasurface Polarization Optics: Independent Phase Control of Arbitrary Orthogonal States of Polarization", Physical Review Letters, vol. 118, Mar. 17, 2017, pp. 113901-1-113901-5.

Mueller et al., "Ultracompact Metasurface In-Line Polarimeter", Optica, vol. 3, No. 1, Jan. 8, 2016, pp. 42-47.

Ni et al., "Broadband Light Bending with Plasmonic Nanoantennas", Sciencexpress, Dec. 22, 2011, 3 pgs., doi: 10.1126/science.1214686.

Ni et al., "Ultra-Thin, Planar, Babinet-Inverted Plasmonic Metalenses", Light: Science & Applications, vol. 2, No. e72, Apr. 26, 2013, pp. 1-6, doi: 10.1038/lsa.2013.28.

Nordin et al., "Micropolarizer Array for Infrared Imaging Polarimetry", Journal of the Optical Society of America A, vol. 16, No. 5, May 1999, pp. 1168-1174.

Extended European Search Report for European Application No. 16869282.0, Search completed Nov. 8, 2019, Mailed Nov. 20, 2019, 15 pgs.

Extended European Search Report for European Application No. 17779772.7, Search completed Oct. 15, 2019, Mailed Oct. 25, 2019, 10 pgs.

Extended European Search Report for European Application No. 17858861.2, Search completed Mar. 13, 2020, Mailed Mar. 23, 2020, 9 pgs.

Extended European Search Report for European Application No. 18805669.1, Search completed Feb. 9, 2021, Mailed Feb. 18, 2021, 13 pgs.

Extended European Search Report for European Application No. 18852460.7, Search completed Mar. 25, 2021, Mailed Apr. 6, 2021, 13 pgs.

Extended European Search Report for European Application No. 19744012.6, Search completed Sep. 3, 2021, Mailed Dec. 16, 2021, 10 pgs.

Extended European Search Report for European Application No. 19830958.5, Search completed Feb. 17, 2022, Mailed Feb. 25, 2022, 8 pgs.

Extended European Search Report for European Application No. 20790964.9, Search completed Nov. 22, 2022, Mailed Dec. 2, 2022, 10 pgs.

Extended European Search Report for European Application No. 20847649.9, Search completed Jul. 20, 2023, Mailed Aug. 1, 2023, 11 Pgs.

Foreign Action other than Search Report on CN 201680077924.9, mailed Aug. 30, 2019.

(56) References Cited

OTHER PUBLICATIONS

International Preliminary Report on Patentability for International Application No. PCT/US2018/038357, Report issued Dec. 24, 2019, Mailed Jan. 2, 2020, 7 pgs.

International Preliminary Report on Patentability for International Application No. PCT/US2008/084068, Report issued May 25, 2010, 5 pgs.

International Preliminary Report on Patentability for International Application No. PCT/US2012/053434, Report issued Mar. 4, 2014, Mailed Mar. 13, 2014, 9 pgs.

International Preliminary Report on Patentability for International Application No. PCT/US2015/064930, Report issued Jun. 13, 2017, Mailed Jun. 22, 2017, 9 pgs.

International Preliminary Report on Patentability for International Application No. PCT/US2016/052685, Report issued Mar. 27, 2018, Mailed Apr. 5, 2018, 9 pgs.

International Preliminary Report on Patentability for International Application No. PCT/US2016/063617, Report issued May 29, 2018, Mailed Jun. 7, 2018, 7 pgs.

International Preliminary Report on Patentability for International Application No. PCT/US2017/026206, Report issued Oct. 9, 2018, Mailed Oct. 18, 2018, 9 pgs.

International Preliminary Report on Patentability for International Application No. PCT/US2017/036897, Report issued Dec. 11, 2018, Mailed Dec. 20, 2018, 9 pgs.

International Preliminary Report on Patentability for International Application No. PCT/US2017/048469, Report issued Feb. 26, 2019, Mailed Mar. 7, 2019, 6 pgs.

International Preliminary Report on Patentability for International Application No. PCT/US2018/031204, Report issued Nov. 5, 2019, Mailed Nov. 14, 2019, 9 pgs.

International Preliminary Report on Patentability for International Application No. PCT/US2018/034460, Report issued Nov. 26, 2019, Mailed Dec. 5, 2019, 7 pgs.

International Preliminary Report on Patentability for International Application No. PCT/US2018/035502, Report issued Dec. 3, 2019, Mailed Dec. 12, 2019, 8 pgs.

International Preliminary Report on Patentability for International Application No. PCT/US2018/046947, Report issued Feb. 18, 2020, Mailed on Feb. 27, 2020, 7 pgs.

International Preliminary Report on Patentability for International Application No. PCT/US2018/049276, Report issued on Mar. 3, 2020, Mailed on Mar. 12, 2020, 9 pgs.

International Preliminary Report on Patentability for International Application No. PCT/US2019/040302, Report issued Jan. 5, 2021, Mailed Jan. 14, 2021, 6 pgs.

International Preliminary Report on Patentability for International Application No. PCT/US2020/028157, Report issued Sep. 28, 2021, Mailed Oct. 28, 2021, 7 pgs.

International Preliminary Report on Patentability for International Application No. PCT/US2020/028159, Report issued Sep. 28, 2021, Mailed on Oct. 28, 2021, 7 pgs.

International Preliminary Report on Patentability for International Application No. PCT/US2020/043600, Report issued Feb. 1, 2022, Mailed on Feb. 10, 2022, 9 pgs.

International Preliminary Report on Patentability for International Application No. PCT/US2022/070043, Report issued Jul. 4, 2023, Mailed on Jul. 20, 2023, 10 pgs.

International Search Report and Written Opinion for International Application No. PCT/US2023/075988, Search completed Jan. 29, 2024, Mailed Mar. 13, 2024, 13 pgs.

Deschapms et al., "The Polder Mission: Instrument Characteristics and Scientific Objectives", IEEE Transactions on Geoscience and Remote Sensing, vol. 32, No. 3, May 1994, pp. 598-615.

Devlin et al., "Arbitrary Spin-to-Orbital Angular Momentum Conversion of Light", Science, vol. 358, Nov. 17, 2017, pp. 896-901, doi: 0.1126/science.aao5392.

Devlin et al., "Broadband High-Efficiency Dielectric Metasurfaces for the Visible Spectrum", PNAS, Sep. 20, 2016, vol. 113, No. 38, pp. 10473-10478, www.pnas.org/cgi/doi/10.1073/pnas.1611740113.

Devlin et al., "High Efficiency Dielectric Metasurfaces at Visible Wavelengths", Arxiv, retrieved from the Internet: URL: <https://arxiv.org/ftp/arxiv/papers/1603/1603.02735.pdf>, Mar. 8, 2016, pp. 1-18.

Ding et al., "Beam-Size-Invariant Spectropolarimeters Using Gap-Plasmon Metasurfaces", ACS Photonics, vol. 4, Feb. 28, 2017, pp. 943-949.

Ding et al., "Gradient Metasurfaces: Fundamentals and Applications", ArXiv:1704:03032v1 [physics.optics], Apr. 10, 2017, 83 pgs.

Ding et al., "Versatile Polarization Generation and Manipulation Using Dielectric Metasurfaces", Laser & Photonics Review, vol. 14, Sep. 23, 2020, pp. 2000116-1-2000116-7.

Dong et al., "Zero-Index Photonic Crystal as Low-Aberration Optical Lens (Conference Presentation)", Proceedings of SPIE 9918, Metamaterials, Metadevices, and Metasystems, Nov. 9, 2016, 2 pgs., doi: 10.1117/12.2237137.

Engelberg et al., "Near-IR Wide Field-of-View Huygens Metalens for Outdoor Imaging Applications", Nanophotonics, vol. 9, No. 2, 2020, pp. 361-370.

Evlyukhin et al., "Optical Response Features of Si-Nanoparticle Arrays", Physical Review B, vol. 82, 2010, pp. 045404-1-045404-11, doi: 10.1103/PhysRevB.82.045404.

Fattal et al., "Flat Dielectric Grating Reflectors with Focusing Abilities", Nature Photonics, May 2, 2010, pp. 1-5, doi: 10.1038/nphoton.2010.116.

Fienup, J. R., "Phase Retrieval Algorithms: A Comparison", Applied Optics, vol. 21, No. 15, Aug. 1, 1982, pp. 2758-2769.

Genevet et al., "Breakthroughs in Photonics 2013: Flat Optics: Wavefronts Control with Huygens' Interfaces", IEEE Photonics Journal, vol. 6, No. 2, Apr. 2014, 4 pgs., doi: 10.1109/JPHOT.2014.2308194.

Genevet et al., "Recent Advances in Planar Optics: From Plasmonic to Dielectric Metasurfaces", Optica, vol. 4, No. 1, Jan. 2017, pp. 139-152, doi: 10.1364/OPTICA.4.000139.

Gerchberg et al., "A Practical Algorithm for the Determination of Phase from Image and Diffraction Plane Pictures", Optik, vol. 35, No. 2, 1972, pp. 1-6.

Goldberg, D. E., "Genetic Algorithms in Search, Optimization, and Machine Learning", Addison Wesley, 1989, 432 pgs., (presented in 2 parts).

Gori, Franco, "Measuring Stokes Parameters by Means of a Polarization Grating", Optics Letters, vol. 24, No. 9, May 1, 1999, pp. 584-586.

Groever et al., "Meta-Lens Doublet in the Visible Region", Nano Letters, Jun. 29, 2017, pp. A-F, doi: 10.1021/acs.nanolett.7b01888.

Gutiérrez-Vega, Julio C., "Optical Phase of Inhomogeneous Jones Matrices: Retardance and Ortho-Transmission States", Optics Letters, vol. 45, No. 7, Apr. 1, 2020, pp. 1639-1642, doi: 10.1364/OL.387644.

Hartwig et al., "Challenges for Reducing the Size of Laser Activated Remote Phosphor Light Engines for DLP Projection", Proceedings of SPIE, International Optical Design Conference, vol. 9293, Dec. 17, 2014, pp. 929313-1-929313-6, doi: 10.1117/12.2073275.

Hasman et al., "Chapter 4: Space-Variant Polarization Manipulation", Progress in Optics, vol. 47, 2005, pp. 215-289, doi: 10.1016/S0079-6638(05)47004-3.

Herrera-Fernandez et al., "Double Diffractive Optical Element System for Near-Field Shaping", Applied Optics, vol. 50, No. 23, Aug. 10, 2011, pp. 4587-4593.

Hidber et al., "Microcontact Printing of Palladium Colloids: Micron-Scale Patterning by Electroless Deposition of Copper", Langmuir, vol. 12, No. 5, 1996, pp. 1375-1380.

Horie et al., "Reflective Optical Phase Modulator Based on High-Contrast Grating Mirrors", Optical Society of America, IEEE, 2014, 2 pgs.

Hsiao et al., "Fundamentals and Applications of Metasurfaces", Small Methods, vol. 1, Mar. 24, 2017, pp. 1600064-1-1600064-20.

Jang et al., "Wavefront Shaping with Disorder-Engineered Metasurfaces", Nature Photonics, 2018, 8 pgs.

Jin et al., "Waveforms for Optimal Sub-keV High-Order Harmonics with Synthesized Two- or Three-Colour Laser Fields", Nature Communications, vol. 5, No. 4003, May 30, 2014, pp. 1-6.

(56) References Cited

OTHER PUBLICATIONS

Juan et al., "Arbitrary Polarization Transformation Based on Two-Dimensional Metallic Rectangular Gratings", Acta Optica Sinica, vol. 31, No. 12, Dec. 31, 2011, 1224001-1-1224001-5, doi:10.3788/AOS201131.1224001.

Karagodsky et al., "Monolithically Integrated Multi-Wavelength VCSEL Arrays Using High-Contrast Gratings", Optics Express, vol. 18, No. 2, Jan. 18, 2010, pp. 694-699, doi: https://doi.org/10.1364/OE.18.000694.

Kats et al., "Giant Birefringence in Optical Antenna Arrays with Widely Tailorable Optical Anisotropy", PNAS, vol. 109, No. 31, Jul. 31, 2012, pp. 12364-12368, doi: 10.1073/pnas.1210686109.

Keller, "Instrumentation for Astrophysical Spectropolarimetry", Astrophysical Spectropolarimetry, 2001, pp. 303-354.

Khorasaninejad et al., "Achromatic Metalens over 60 nm Bandwidth in the Visible and Metalens with Reverse Chromatic Dispersion", Nano Letters, Jan. 26, 2017, pp. A-F, doi: 10.1021/acs.nanolett.6b05137.

Khorasaninejad et al., "Achromatic Metasurface Lens at Telecommunication Wavelengths", Nanno Letters, Jul. 2, 2015, pp. A-E, doi: 10.1021/acs.nanolett.5b01727.

Khorasaninejad et al., "Broadband and Chiral Binary Dielectric Meta-Holograms", Science Advances, vol. 2, No. e1501258, May 13, 2016, pp. 1-6, doi:10.1126/sciadv.1501258.

Khorasaninejad et al., "Broadband Multifunctional Efficient Meta-Gratings Based on Dielectric Waveguide Phase Shifters", Nano Letters, Sep. 11, 2015, pp. A-G, doi: 10.1021/acs.nanolett.5b02524.

Khorasaninejad et al., "Metalenses at Visible Wavelengths: Diffraction-Limited Focusing and Subwavelength Resolution Imaging", Science, vol. 352, No. 6290, Jun. 3, 2016, pp. 1190-1194, doi: 10.1126/science.aaf6644.

Khorasaninejad et al., "Multispectral Chiral Imaging with a Metalens", Nano Letters, vol. 16, Jun. 7, 2016, pp. 4595-4600, doi: 10.1021/acs.nanolett.6b01897.

Khorasaninejad et al., "Planar Lenses at Visible Wavelengths", Arxiv, May 7, 2016, 17 pgs.

Khorasaninejad et al., "Polarization-Insensitive Metalenses at Visible Wavelengths", Nano Letters, Oct. 24, 2016, pp. A-F, doi: 10.1021/acs.nanolett.6b03626.

Khorasaninejad et al., "Silicon Nanofin Grating as a Miniature Chirality-Distinguishing Beam-Splitter", Nature Communications, vol. 5, No. 5386, Nov. 12, 2014, pp. 1-6, doi: 10.1038/ncomms6386.

Khorasaninejad et al., "Super-Dispersive Off-Axis Meta-Lenses for Compact High Resolution Spectroscopy", Nano Letters, Apr. 19, 2016, pp. A-F, doi: 10.1021/acs.nanolett.6b01097.

Khorasaninejad et al., "Visible Wavelength Planar Metalenses Based on Titanium Dioxide", IEEE Journal of Selected Topics in Quantum Electronics, vol. 23, No. 3, May/Jun. 2017, 16 pgs.

Kildishev et al., "Planar Photonics with Metasurfaces", Science, vol. 339, No. 6125, Mar. 15, 2013, pp. 1232009-1-1232009-6, DOI: 10.1126.science. 1232009.

Kokkoris et al., "Nanoscale Roughness Effects at the Interface of Lithography and Plasma Etching: Modeling of Line-Edge-Roughness Transfer During Plasma Etching", IEEE Transactions on Plasma Science, vol. 37, No. 9, Sep. 2009, pp. 1705-1714, doi: 10.1109/TPS.2009.2024117.

Kominami et al., "Dipole and Slot Elements and Arrays on Semi-Infinite Substrates", IEEE Transactions on Antennas and Propagation, vol. AP33, No. 6, Jun. 1985, pp. 600-607.

Krasnok et al., "All-Dielectric Optical Nanoantennas", Optics Express, vol. 20, No. 18, Aug. 27, 2012, pp. 20599-20604.

Kress et al., "Applied Digital Optics from Micro-Optics to Nanophotonics", Applied Digital Optics, Wiley, 2009, 30 pgs.

Lalanne et al., "Interaction Between Optical Nano-objects at Metallo-dielectric Interfaces", Nature Physics, vol. 2, Aug. 2006, pp. 551-556, doi: 10.1038/nphys364.

Lee et al., "Giant Nonlinear Response from Plasmonic Metasurfaces Coupled to Intersubband Transitions", Nature, vol. 511, Jul. 3, 2014, pp. 65-69.

Leveque et al., "Transient Behavior of Surface Plasmon Polaritons Scattered at a Subwavelength Groove", Physical Reviews B, vol. 76, Oct. 18, 2007, pp. 155418-1-155418-8, doi: 10.1103/PhysRevB.76.155418.

Lezec et al., "Beaming Light from a Subwavelength Aperture", Science, vol. 297, Aug. 2, 2002, pp. 820-822, doi: 10.1126/science.1071895.

Li et al., "Achromatic Flat Optical Components via Compensation between Structure and Material Dispersions.", Scientific Reports, vol. 6, No. 19885, Jan. 22, 2016, pp. 1-7, doi: 10.1038/srep19885.

Li et al., "All-Silicon Nanorod-Based Dammann Gratings", Optics Letters, vol. 40, No. 18, Sep. 15, 2015, pp. 4285-4288.

Li et al., "Broadband Diodelike Asymmetric Transmission of Linearly Polarized Light in Ultrathin Hybrid Metamaterial", Applied Physics Letters, vol. 105, Nov. 19, 2014, pp. 201103-1-201103-5, doi: 10.1063/1.4902162.

Li et al., "Dispersion Controlling Meta-Lens at Visible Frequency", Optics Express, vol. 25, No. 18, Sep. 4, 2017, pp. 21419-21427.

Li et al., "Flat Metasurfaces to Focus Electromagnetic Waves in Reflection Geometry", Optics Letters, vol. 37, No. 23, Dec. 1, 2012, pp. 4940-4942.

Li et al., "Metalens-Based Miniaturized Optical Systems", Micromachines, vol. 10, No. 310, May 8, 2019, pp. 1-21, doi: 10.3390/mi10050310.

Lim et al., "Self-Mixing Imaging Sensor Using a Monolithic VCSEL Array with Parallel Readout", Optics Express, vol. 17, No. 7, Mar. 30, 2009, pp. 5517-5525.

Lin et al., "Dielectric Gradient Metasurface Optical Elements", Science, vol. 345, No. 6194, Jul. 18, 2014, pp. 298-302, doi: 10.1126/science.1253213.

Liu et al., "Realization of Polarization Evolution on Higher-Order Poincare Sphere with Metasurface", Applied Physics Letters, vol. 104, 2014, pp. 191110-1-191101-4, doi: 10.1063/1.4878409.

Tyo et al., "Review of Passive Imaging Polarimetry for Remote Sensing Applications", Applied Optics, vol. 45, Aug. 1, 2006, pp. 5453-5469.

Vo et al., "Sub-Wavelength Grating Lenses with a Twist", IEEE Photonics Technology Letters, vol. 26, No. 13, Jul. 1, 2014, pp. 1375-1378, DOI: 10.1109/LPT.2014.2325947.

Voelkel et al., "Laser Beam Homogenizing: Limitations and Constraints", DPIE, Europe, Optical Systems Design, 2008, 12 pgs.

Voelz, "Chapter 6: Transmittance Functions, Lenses, and Gratings", pp. 89-111.

Walther et al., "Spatial and Spectral Light Shaping with Metamaterials", Advanced Materials, vol. 24, 2012, pp. 6300-6304, doi: 10.1002/adma.201202540.

Wang et al., "Broadband Achromatic Optical Metasurface Devices", Nature Communications, vol. 8, No. 187, Aug. 4, 2017, pp. 1-9, doi: 10.1038/s41467-017-00166-7.

Wang et al., "Generation of Steep Phase Anisotropy with Zero-Backscattering by Arrays of Coupled Dielectric Nano-Resonators", Applied Physics Letters, vol. 105, Sep. 25, 2014, pp. 121112-1-121112-5, doi: https://doi.org/10.1063/1.4896631.

Wang et al., "Information Authentication Using an Optical Dielectric Metasurface", Journal of Physics D: Applied Physics, Institute of Physics Publishing, Bristol, vol. 50, No. 36, Aug. 17, 2017, pp. 1-5.

Wei et al., "Design of Ultracompact Polarimeters based on Dielectric Metasurfaces", Optics Letters, vol. 42, No. 8, Apr. 11, 2017, pp. 1580-1583, doi: https://doi.org/10.1364/OL.42.001580.

Wen et al., "Metasurface for Characterization of the Polarization State of Light", Optics Express, vol. 23, No. 8, 2015, pp. 10272-10281, DOI:10.1364/OE.23.010272.

Wiktorowicz et al., "Toward the Detection of Exoplanet Transits with Polarimetry", The Astrophysical Journal, vol. 795, No. 12, Nov. 1, 2014, 6 pgs., doi: 10.1088/0004-637X/795/1/12.

Wolf, "Introduction to the Theory of Coherence and Polarization of Light", Cambridge University Press, 2007, 235 pgs.

Wu et al., "Spectrally selective chiral silicon metasurfaces based on infrared Fano resonances", Nature Communications, vol. 5, No. 3892, 2014, published online May 27, 2014, 9 pgs., DOI: 10.1038/ncomms4892.

(56) References Cited

OTHER PUBLICATIONS

Xu et al., "Metasurface External Cavity Laser", Applied Physics Letters, vol. 107, No. 221105, 2015, pp. 221105-1-221105-5, doi: 10.1063/1.4936887.

Xu et al., "Metasurface Quantum-Cascade Laser with Electrically Switchable Polarization", Optica, vol. 4, No. 4, Apr. 2017, pp. 468-475.

Yang et al., "Design of Ultrathin Plasmonic Quarter-Wave Plate based on Period Coupling", Optics Letters, vol. 38, No. 5, 2013, pp. 679-681, doi: https://doi.org/10.1364/OL.38.000679.

Yang et al., "Generalized Hartmann-Shack Array of Dielectric Metalens sub-arrays for Polarimetric Beam Profiling", Nature Communications, vol. 9, No. 4607, Nov. 2, 2018, pp. 1-7, doi: 10.1038/s41467-018-07056-6.

Yao et al., "Wide Wavelength Tuning of Optical Antennas on Graphene with Nanosecond Response Time", Nano Letters, vol. 14, No. 1, 2014, Dec. 3, 2013, pp. A-F, doi: 10.1021/nl403751p.

Yariv et al., Photonics: Optical Electronics in Modern Communications, 6th edition, Oxford University Press, 2006, 849 pgs.

Yu et al., "A Broadband, Background-Free Quarter-Wave Plate Based on Plasmonic Metasurfaces", Nano Letters, vol. 12, No. 12, Nov. 3, 2012, pp. A-F, doi: dx.doi.org/10.1021/nl303445u.

Yu et al., "Flat Optics with Designer Metasurfaces", Nature Materials, vol. 13, Feb. 2014, pp. 139-150, doi :10.1038/NMAT3839.

Yu et al., "Flat optics: Controlling Wavefronts with Optical Antenna Metasurfaces", IEEE Journal of Selected Topics, vol. 19, No. 3, May/Jun. 2013, 23 pgs.

Yu et al., "High-Transmission Dielectric Metasurface with $2\pi$ Phase Control at Visible Wavelengths", Laser & Photonics Reviews, vol. 9, No. 4, Jun. 26, 2015, pp. 412-418, doi: 10.1002/lpor.201500041.

Yu et al., "Light Propagation with Phase Discontinuities: Generalized Laws of Reflection and Refraction", Science, vol. 334, No. 6054, Oct. 21, 2011, pp. 333-337, doi: 10.1126/science.1210713.

Yu et al., "Optical Metasurfaces and Prospect of their Applications Including Fiber Optics", Journal of Lightwave Technology, vol. 33, No. 12, 2015, pp. 2344-2358.

Yu et al., "Quantum Cascade Lasers with Integrated Plasmonic Antenna-Array Collimators", Optics Express, vol. 16, No. 24, Nov. 24, 2008, pp. 19447-19461.

Yu et al., "Small Divergence Edge-Emitting Semiconductor Lasers with Two-Dimensional Plasmonic Collimators", Applied Physics Letters, vol. 93, 2008, pp. 181101-1-181101-3, doi: 10.1063/1.3009599.

Yu et al., "Small-Divergence Semiconductor Lasers by Plasmonic Collimation", Nature Photonics, vol. 2, Sep. 2008, pp. 564-570, doi: 10.1038/nphoton.2008.052.

Yun et al., "Skew Aberration: a Form of Polarization Aberration", Optics Letters, vol. 36, No. 20, pp. 4062-4064, doi: 10.1364/OL. 36.004062.

Zhan et al., "Low-Contrast Dielectric Metasurface Optics", ACS Photonics, vol. 3, 2016, pp. A-F, doi: 10.1021/acsphotonics. 5b00660.

Zhang et al., "High Efficiency all-Dielectric Pixelated Metasurface for Near-Infrared Full-Stokes Polarization Detection", Photonics Research, vol. 9, No. 4, Apr. 2021, pp. 583-589, doi: https://doi.org/10.1364/PRJ.415342.

Zhao et al., "Mie Resonance-Based Dielectric Metamaterials", Materials Today, vol. 12, No. 12, Dec. 2009, pp. 60-69.

Zhao et al., "Multichannel Vectorial Holographic Display and Encryption", Light Science & Applications, vol. 7, No. 95, 2018, 9 pgs., doi: 10.1038/s41377-018-0091-0.

Zhao et al., "Recent Advances on Optical Metasurfaces", Journal of Optics, Institute of Physics Publishing, vol. 16, Issue 12, 2014, 14 pgs., doi: 10.1088/2040489781/16/12/123001.

Zhao et al., "Tailoring the Dispersion of Plasmonic Nanorods to Realize Broadband Optical Meta-Waveplates", Nano Letter, vol. 13, Feb. 5, 2013, pp. 1086-1091, doi: dx.doi.org/10.1021/nl304392b.

Zhao et al., "Twisted Optical metamaterials for planarized ultrathin broadband circular polarizers", Nature Communications, vol. 3, No. 870, 2012, pp. 1-7, DOI: 10.1038/ncomms1877.

Zhou et al., "Characteristic Analysis of Compact Spectrometer Based on Off-Axis Meta-Lens", Applied Sciences, vol. 8, No. 321, 2018, 11 pgs., doi: 10.3390/app8030321.

Zhou et al., "Plasmonic Holographic Imaging with V-shaped Nanoantenna Array", Optics Express, vol. 21, No. 4, Feb. 25, 2013, pp. 4348-4354.

Zhou et al., "Progress on Vertical-Cavity Surface-Emitting Laser Arrays for Infrared Illumination Applications", Proc. SPIE 9001, Vertical-Cavity Surface-Emitting Lasers XVIII, 90010E, Feb. 27, 2014, 11 pgs.

Zhu et al., "Ultra-Compact Visible Chiral Spectrometer with Meta-Lenses", APL Photonics, vol. 2, Feb. 7, 2017, pp. 036103-1-036103-12, doi: https://doi.org/10.1063/1.4974259.

Zou et al., "Dielectric Resonator Nanoantennas at Visible Frequencies", Optics Express, vol. 21, No. 1, Jan. 14, 2013, pp. 1344-1352.

"Materials for High and Low Refractive Index Coatings", Sigma-Aldrich Inc., retrieved from the Internet URL: <www.sigmaaldrich. com/materials-science/organic-electronics/ri-coatings.html>, 2019, 3 pgs.

"These Tiny, Incredible 'Metalenses' are the Next Giant Leap in Optics", PetaPixel, retrieved from the Internet URL: <https://petapixel.com/2016/06/03/incredible-flat-metalenses-may-future-optics/>, Jun. 3, 2016, 21 pgs.

Aieta et al., "Aberration-Free Ultrathin Flat Lenses and Axicons at Telecom Wavelengths Based on Plasmonic Metasurfaces", Nano Letters, vol. 12, Aug. 15, 2012, pp. 4932-4936, doi: dx.doi.org/10. 1021/nl302516v.

Aieta et al., "Aberrations of Flat Lenses and Aplanatic Metasurfaces", Optics Express, vol. 21, No. 25, Dec. 16, 2013, pp. 31530-31539, doi: 10.1364/OE.21.031530.

Aieta et al., "Multiwavelength Achromatic Metasurfaces by Dispersive Phase Compensation", Sciences, 2015, 15 pgs., doi: 10.1126/science.aaa2494.

Aieta et al., "Out-of-Plane Reflection and Refraction of Light by Anisotropic Optical Antenna Metasurfaces with Phase Discontinuities", Nano Letters, Feb. 13, 2012, pp. A-E, doi: dx.doi.org/10.1021/nl300204s.

Andreou et al., "Polarization Imaging: Principles and Integrated Polarimeters", IEEE Sensors Journal, vol. 2, No. 6, 2002, pp. 566-576.

Arbabi et al., "Dielectric Metasurfaces for Complete Control of Phase and Polarization with Subwavelength Spatial Resolution and High Transmission", Nature Nanotechnology, vol. 10, Aug. 31, 2015, pp. 937-943, doi: 10.1038/NNANO.2015.186.

Arbabi et al., "Efficient Dielectric Metasurface Collimating Lenses for Mid-Infrared Quantum Cascade Lasers", Optics Express, vol. 23, No. 26, Dec. 28, 2015, pp. 33310-33317, doi: 10.1364/OE.23. 033310.da.

Arbabi et al., "Full Stokes Imaging Polarimetry Using Dielectric Metasurfaces", ACS Photonics, Jul. 16, 2018, 5, pp. 3132-3140, DOI: 10.1021/acsphotonics.8b00362.

Arbabi et al., "Miniature Optical Planar Camera Based on a Wide-Angle Metasurface Doublet Corrected for Monochromatic Aberrations", Nature Communications, vol. 7, No. 13682, Nov. 28, 2016, pp. 1-9, doi: 10.1038/ncomms13682.

Arbabi et al., "Subwavelength-Thick Lenses with High Numerical Apertures and Large Efficiency Based on High-Contrast Transmitarrays", Nature Communications, vol. 6, No. 7069, May 7, 2015, pp. 1-6, doi: 10.1038/ncomms8069.

Arbabi et al., "Supplementary Figures of Miniature Optical Planar Camera Based on a Wide-Angle Metasurface Doublet Corrected for Monochromatic Aberrations", Nature Communications, vol. 7, Article No. 13682, 2016, 9 pgs.

Arbabi et al., "Vectorial Holograms with a Dielectric Metasurface: Ultimate Polarization Pattern Generation", ACS Photonics, vol. 6, 2019, pp. 2712-2718, doi: 10.1021/acsphotonics.9b00678.

Arrizon et al., "Pixelated Phase Computer Holograms for the Accurate Encoding of Scalar Complex Fields", Journal of the Optical Society of America A, vol. 24, No. 11, 2007, pp. 3500-3507.

Azadegan et al., "A Novel Approach for Miniaturization of Slot Antennas", IEEE Transactions on Antennas and Propagation, vol. 51, No. 3, Mar. 2003, pp. 421-429, doi: 10.1109/TAP.2003.809853.

(56) References Cited

OTHER PUBLICATIONS

Azzam, R. M. A., "Arrangement of Four Photodetectors for Measuring the State of Polarization of Light", Optics Letters, vol. 10, No. 7, Jul. 1985, pp. 309-311.

Azzam, R. M. A., "Division-of-Amplitude Photopolarimeter (DOAP) for the Simultaneous Measurement of All Four Stokes Parameters of Light", Optica Acta, vol. 29, No. 5, 1982, pp. 685-689.

Azzam, R. M. A., "Stokes-Vector and Mueller-Matrix Polarimetry [Invited]", Journal of the Optical Society of America A, vol. 33, No. 7, Jul. 2016, 1396-1408.

Azzam et al., "Accurate Calibration of the Four-Detector Photopolarimeter with Imperfect Polarizing Optical Elements", Journal of the Optical Society of America A, vol. 6, No. 10, Oct. 1989, pp. 1513-1521.

Azzam et al., "Photopolarimeter Based on Planar Grating Diffraction", Journal of the Optical Society of America A, vol. 10, No. 6, Jun. 1993, pp. 1190-1196.

Bao et al., "Toward the Capacity Limit of 2D Planar Jones Matrix with a Single-Layer Metasurface", Science Advances, vol. 7, Jun. 18, 2021, pp. 1-6, doi: 10.1126/sciadv.abh0365.

Berry et al., "Measurement of the Stokes Parameters of Light", Applied Optics, vol. 16, No. 12, Dec. 1977, pp. 3200-3205.

Birch et al., "3D Imaging with Structured Illumination for Advanced Security Applications", Sandia Report, Sep. 2015, retrieved from the internet: URL: <https://www.osti.gov/biblio/1221516>, 64 pgs., doi: 10.2172/1221516.

Blanchard et al., "Modeling Nanoscale, V-Shaped Antennas for the Design of Optical Phased Arrays", Physical Review B, vol. 85, 2012, pp. 155457-1-155457-11, doi: 10.1103/physRevB.85.155457.

Bomzon et al., "Real-Time Analysis of Partially Polarized Light with a Space-Variant Subwavelength Dielectric Grating", Optics Letters, vol. 27, No. 3, Feb. 1, 2002, pp. 188-190.

Bomzon et al., "Spatial Fourier-Transform Polarimetry Using Space-Variant Subwavelength Metal-Stripe Polarizers", Optics Letters, vol. 26, No. 21, Nov. 1, 2001, pp. 1711-1713.

International Preliminary Report on Patentability for International Application No. PCT/US2023/075988, Report issued Mar. 1, 2025, Mailed Apr. 17, 2025, 9 pgs.

International Preliminary Report on Patentability received for International Application No. PCT/US2019/014975, Report issued Jul. 28, 2020, Mailed on Aug. 6, 2020, 10 pgs.

Mirsalehi, "Optical Information Processing", Encyclopedia of Physical Science and Technology, 3rd edition, 2001, pp. 335-340.

Nikolova et al., "Polarization Holography", Bulgarian Academy of Sciences, Sofia, P. S. Ramanujam, Technical University of Denmark, Roskilde Cambridge University, Aug. 2009, 266 pgs.

Shurcliff, "Polarized Light: Production and Use", Harvard University Press, Science, 1962, 219 pgs.

* cited by examiner

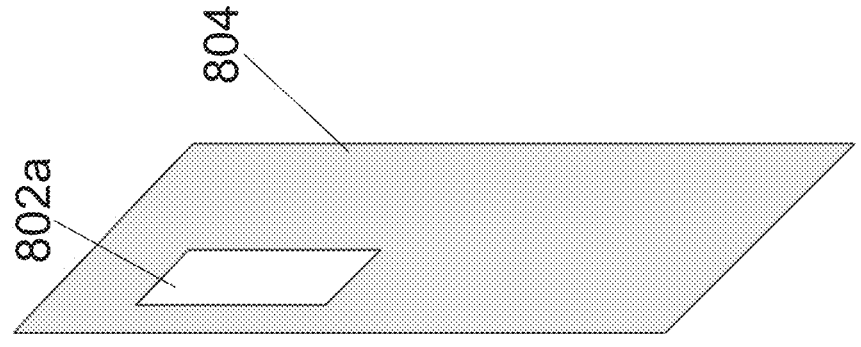
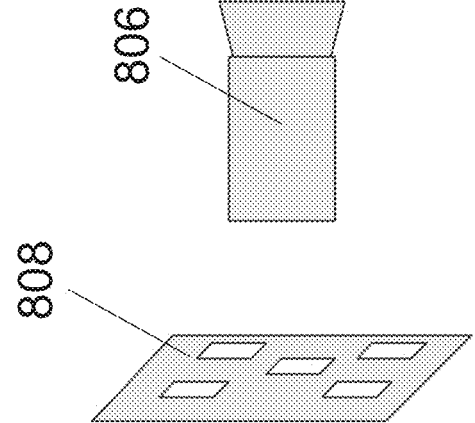
*Fig. 8A*

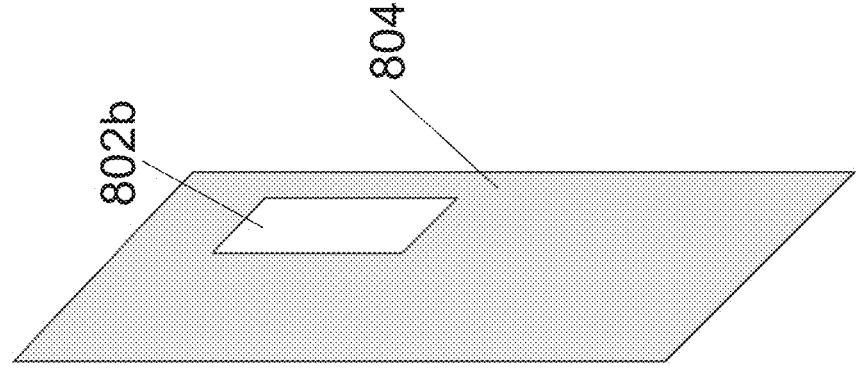
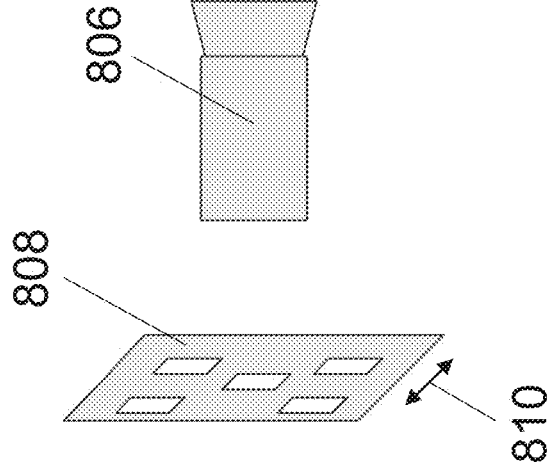
*Fig. 8B*

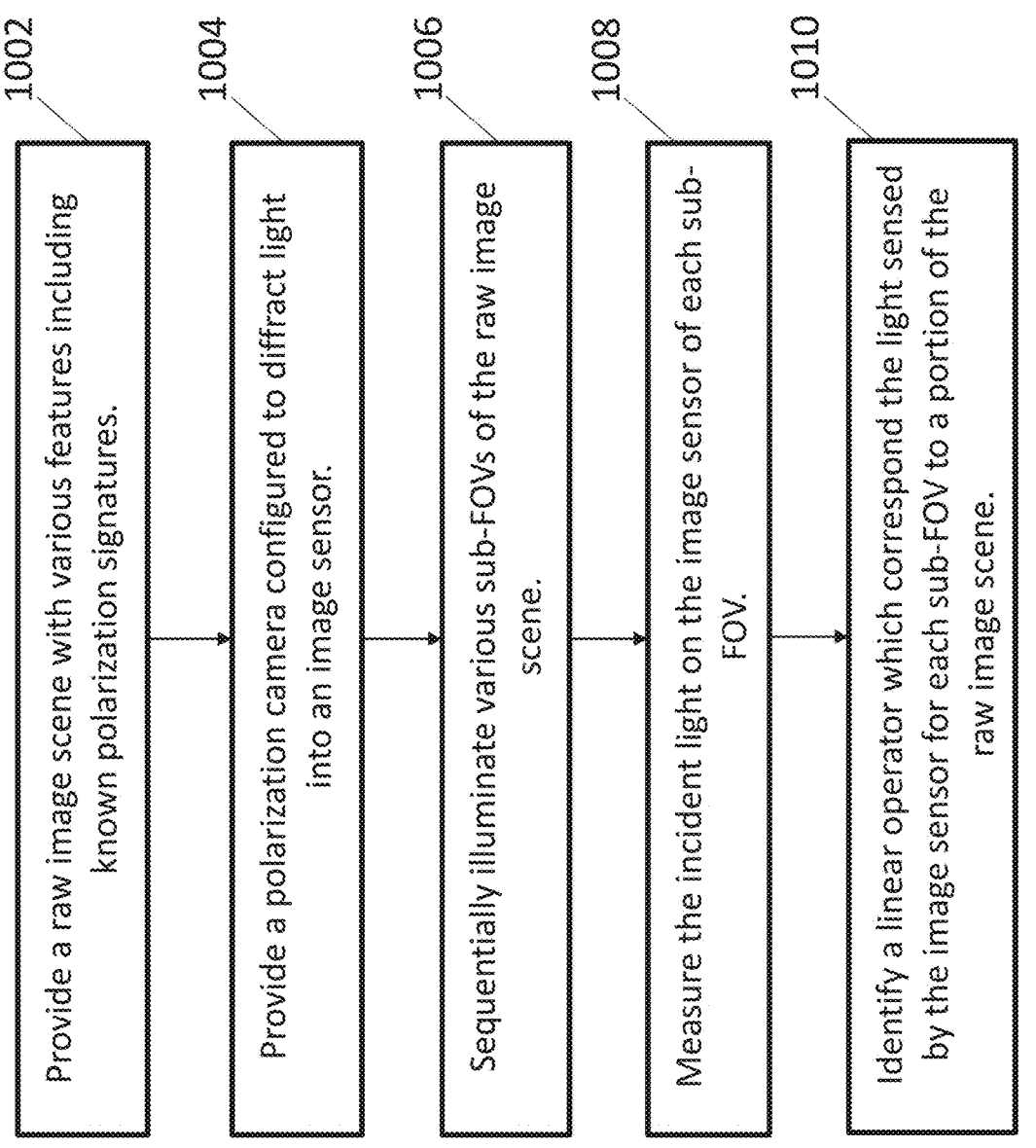

1002 — Provide a raw image scene with various features including known polarization signatures.

1004 — Provide a polarization camera configured to diffract light into an image sensor.

1006 — Sequentially illuminate various sub-FOVs of the raw image scene.

1008 — Measure the incident light on the image sensor of each sub-FOV.

1010 — Identify a linear operator which correspond the light sensed by the image sensor for each sub-FOV to a portion of the raw image scene.

*Fig. 10*

SHARED-APERTURE CAMERA SYSTEM AND CALIBRATION METHOD

CROSS-REFERENCE TO RELATED APPLICATIONS

The current application claims priority under 35 U.S.C. 119(e) to U.S. Provisional Application No. 63/378,427, entitled "Shared-Aperture Camera System" to Latawiec et al., filed Oct. 5, 2022, the disclosure of which is incorporated herein by reference in its entirety.

FIELD OF THE INVENTION

The present invention generally relates to shared-aperture camera systems. More specifically, the present invention relates to shared-aperture polarization camera systems utilizing metasurface elements.

BACKGROUND

Metasurface elements are diffractive optical elements in which individual waveguide elements have subwavelength spacing and have a planar profile. Metasurface elements have recently been developed for application in the UV-IR bands (300-10,000 nm). Compared to traditional refractive optics, metasurface elements introduce phase shifts onto a light field. Metasurface elements have thicknesses on the order of the wavelength of light at which they are designed to operate, whereas traditional refractive surfaces have thicknesses that are 10-100 times (or more) larger than the wavelength of light at which they are designed to operate. Additionally, metasurface elements typically have no variation in thickness in the constituent elements and are able to shape light without any curvature, as is required for refractive optics. Compared to traditional diffractive optical elements (DOEs), for example binary diffractive optics, metasurface elements have the ability to impart a range of phase shifts on an incident light field. At a minimum, the metasurface elements can have phase shifts between 0-2π with at least 5 distinct values from that range, whereas binary DOEs are only able to impart two distinct values of phase shift and are often limited to phase shifts of either 0 or 1π. Compared to multi-level DOE's, metasurface elements do not require height variation of its constituent elements along the optical axis, only the in-plane geometries of the metasurface element features may vary.

SUMMARY OF THE DISCLOSURE

In some aspects, the techniques described herein relate to a polarization imaging device including: an aperture; a first metasurface configured to diffract incident light going through the aperture such that a first polarization of incident light diffracts in a first direction and a second polarization of the incident light diffracts in a second direction; an image sensor; and a planar diffractive lens including a second metasurface configured to focus the first polarization of incident light diffracted in the first direction onto a first portion of the image sensor and focus the second polarization of incident light diffracted in the second direction onto a second portion of the image sensor.

In some aspects, the techniques described herein relate to a polarization imaging device, further including a bandpass filter positioned between the planar diffractive lens and the image sensor.

In some aspects, the techniques described herein relate to a polarization imaging device, wherein the first metasurface is positioned within an opening of the aperture.

In some aspects, the techniques described herein relate to a polarization imaging device, wherein the aperture and the first metasurface are positioned on a same surface of a substrate.

In some aspects, the techniques described herein relate to a polarization imaging device, wherein the aperture and the first metasurface are positioned on a surface of the substrate closest to the incident light.

In some aspects, the techniques described herein relate to a polarization imaging device, wherein the aperture and the first metasurface are positioned on a surface of the substrate opposite to the incident light.

In some aspects, the techniques described herein relate to a polarization imaging device, wherein the first metasurface is further configured to pass a zero order light.

In some aspects, the techniques described herein relate to a polarization imaging device, wherein the planar diffractive lens is further configured to focus the zero order light onto a third portion of the image sensor.

In some aspects, the techniques described herein relate to a polarization imaging device, wherein the first metasurface directs both the zero order light and the second polarization of incident light in the same direction.

In some aspects, the techniques described herein relate to a polarization imaging device, wherein the planar diffractive lens focuses both the zero order light and the second polarization of incident light onto the second portion of the image sensor.

In some aspects, the techniques described herein relate to a polarization imaging device, wherein the image sensor has a smaller width than the width of the aperture and/or the planar diffractive lens.

In some aspects, the techniques described herein relate to a polarization imaging device, further including: a first substrate, wherein the planar diffractive lens is positioned on the first substrate a reflective surface positioned on the first substrate, wherein the backside of the aperture is reflective, and wherein the reflective surface and the shared aperture create a folded optical path configured to fold the diffracted light.

In some aspects, the techniques described herein relate to a polarization imaging device, wherein the reflective surface and/or the reflective backside of the shared aperture include diffractive structures.

In some aspects, the techniques described herein relate to a polarization imaging device, wherein the diffractive structures include metasurface elements.

In some aspects, the techniques described herein relate to a polarization imaging device, wherein the aperture and the first metasurface are positioned on a same surface of a second substrate and wherein the folded optical path passes through the second substrate.

In some aspects, the techniques described herein relate to a polarization imaging device, wherein the reflective surface is positioned to cover a portion of the first substrate, the planar diffractive lens surrounds the reflective surface, and the diffracted light reflects off the reflective surface, reflects off the reflective backside of the aperture and diffracts through the planar diffractive lens.

In some aspects, the techniques described herein relate to a calibration method including: providing a raw image scene with various features each including known polarization signatures; providing a polarization camera configured to diffract different polarizations of light into different portions of an image sensor; sequentially illuminating various sub-field of views (FOVs) of the raw image scene; measuring the incident light on the image sensor from light reflected from each sub-FOV; and identifying a linear operator which corresponds the light sensed by the image sensor for each sub-FOV to the location and polarization of the light reflected off a portion of the raw image scene.

In some aspects, the techniques described herein relate to a calibration method, wherein light incident on different portions of the image sensor translates depending on the position of the sub-FOV.

In some aspects, the techniques described herein relate to a calibration method, wherein the light incident on different portions of the image sensor has an intensity signature based on the polarization of the light reflected from each sub-FOV.

In some aspects, the techniques described herein relate to a calibration method, further including: illuminating a sub-FOV of a second raw image scene; measuring the incident light on the image sensor from light reflected from the sub-FOV of the second raw image scene; and computing the position and polarization of the sub-FOV of the second raw image scene based on the computed linear operator.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 8A and 8B illustrate two steps in the calibration technique in accordance with an embodiment of the invention.

FIG. 10 is a flow chart illustrating a calibration process in accordance with an embodiment of the invention.

DETAILED DESCRIPTION

Disclosed herein is a device architecture for polarization imaging applications, where a first metasurface splits incident light into different directions, with intensity dependent on the polarization of the incident light. Depending on polarization, different intensities go into the different directions. The different directions are imaged onto the sensor, and the raw image is then synthesized into an image describing the polarization at each pixel. In some embodiments, the first metasurface is solely a polarization beam splitter or for redirecting portions of the light in more than one direction (e.g. does not apply any lensing), and a second planar lens acts as the imaging lens.

Some embodiments include a compact class of imaging systems. Two planar surfaces of a planar diffractive optic may contain a combination of reflective and diffractive surfaces which may split an incident scene into different directions. In some embodiments, the split of the incident scene may be dependent on some property of the scene (e.g. polarization, wavelength). For example, different polarizations of light may be split into different directions. The different polarizations of light may be right hand circularly polarized light and left hand circularly polarized light. The different polarizations of light may be vertical linear polarized light and horizontal linear polarized light. The different polarizations of light may be different elliptically polarized light at various angles. The different directions extending from this "shared aperture" may then be imaged on a sensor. Because each of the subimages share an aperture, the images may be recombined and properties of the scene may be recovered. This architecture is compact, in that the optical path length is extended by using reflective (or diffractive-reflective) surfaces at different positions.

Figure 1:
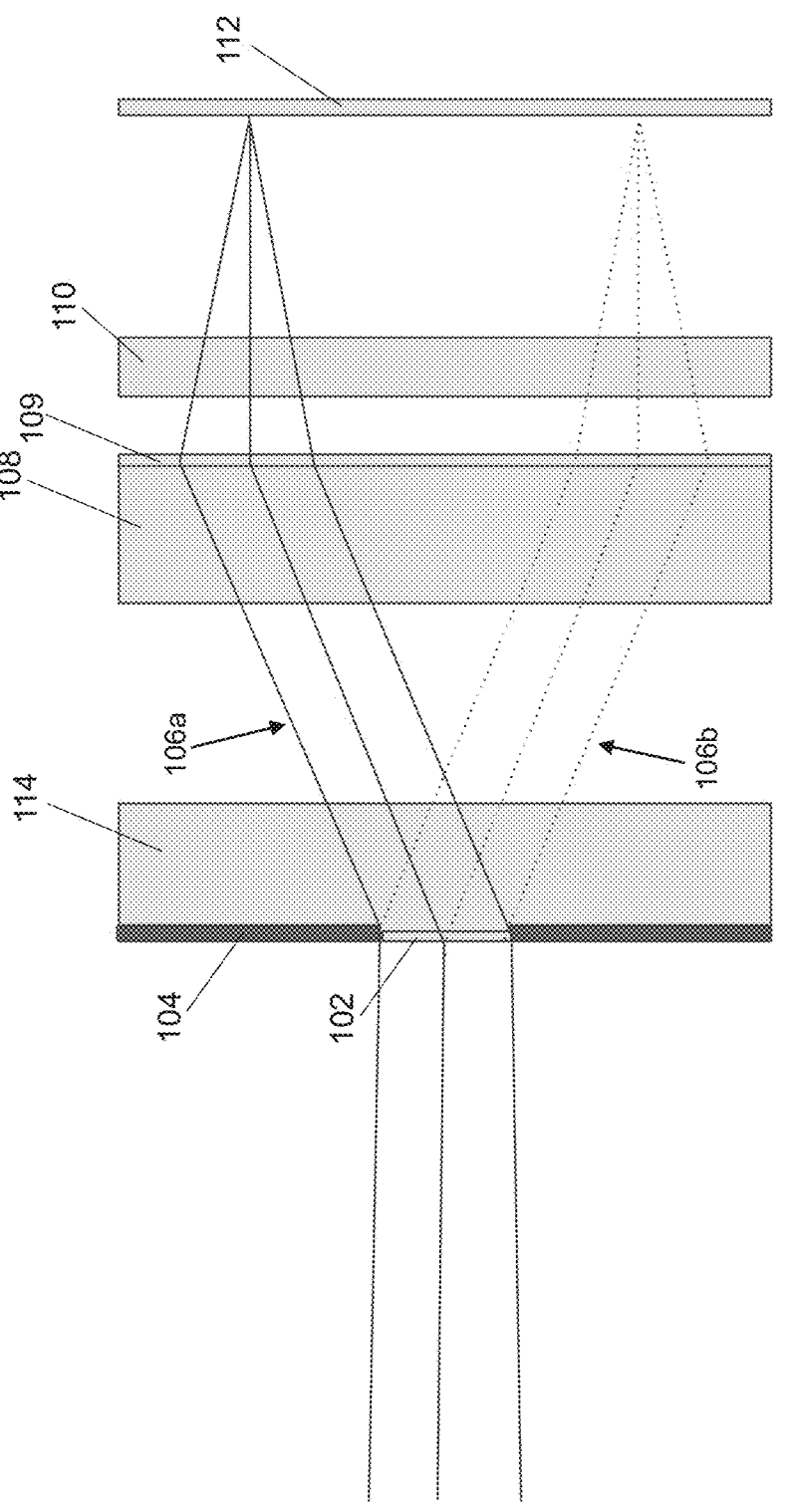
FIG. 1 schematically illustrates an example shared aperture imaging system in accordance with an embodiment of the invention.
Figure 6:
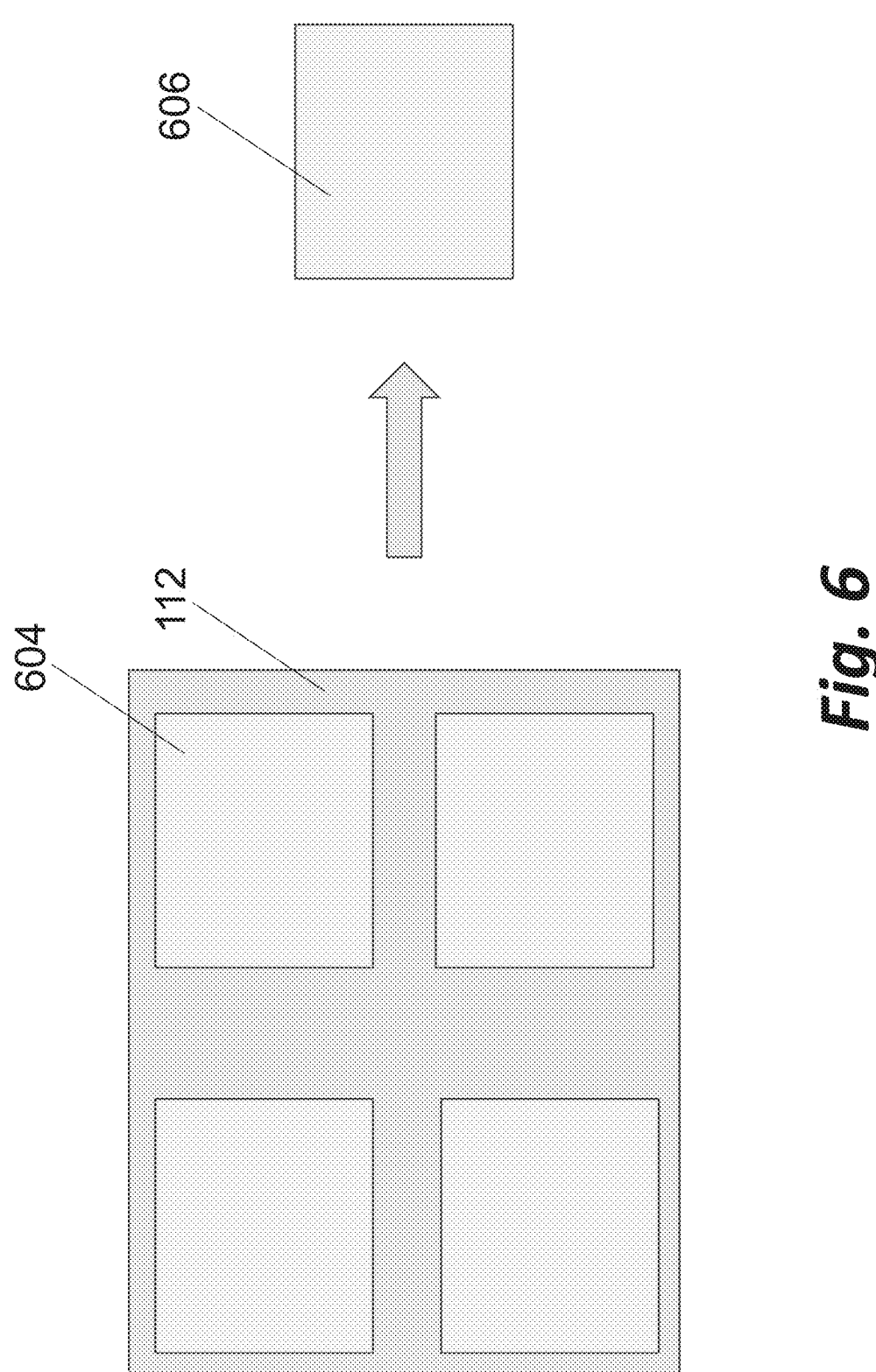
FIG. 6 schematically illustrates an example image sensor utilizing sub-images in accordance with an embodiment of the invention.

FIG. 1 schematically illustrates an example shared aperture imaging system in accordance with an embodiment of the invention. The imaging system includes a first metasurface 102 within an aperture 104. In some embodiments, the first metasurface 102 may include metasurface elements which include asymmetric cross-sectional shapes, including rectangular, diamond, square, and/or oval cross-section shaped posts. The incident field may be split by the first metasurface 102 into a first sub-image 106a and a second sub-image 106b such that the first sub-image 106a and the second sub-image 106b are directed into different directions. The split incident field may pass through a planar diffractive lens 109 which may include a second metasurface. The planar diffractive lens 109 may be positioned on a substrate 108. The intensity of the first sub-image 106a and the second sub-image 106b may be dependent on the information in the incident field (e.g. wavelength, polarization). In some embodiments, the substrate carrying the first metasurface 102 and the planar diffractive lens 109 may be the same. In some embodiments, the planar diffractive lens 109 may include metasurface elements which include symmetric cross-sectional shapes (e.g. circular cross-section shaped posts), and/or asymmetric cross-sectional shapes (e.g. rectangular, square, diamond and/or oval cross-section shaped posts). In some embodiments, the planar diffractive lens 109 may be a non-metasurface-based element which may be either a refractive element or other type of diffractive element (e.g. a lenslet array). In some embodiments, the first sub-image 106a and the second sub-image 106b may pass through an external bandpass filter 110. The first sub-image 106a and the second sub-image 106b may be incident on an image sensor 112. In some embodiments, the chief rays of the first sub-image 106a may be a first polarization P1 light and the second sub-image 106b may be a second polarization P2 light. While, in the illustrated example, the first metasurface 102 diffracts the incident field into the first sub-image 106a and the second sub-image 106b, the first metasurface 102 may diffract the incident field into more rays. For example, the first metasurface 102 may diffract the incident field into four channels which may be chosen to be non-coplanar on the Poincare sphere. This is illustrated in FIG. 6 (described below) which includes four sub-images in different positions of an image sensor. Also, this is illustrated in FIGS. 8A and 8B which includes different FOVs in an isometric view. The planar diffractive lens 109 may be configured to focus the first polarization 106a of incident light diffracted in the first direction onto a first portion of the image sensor 112 and focus the second polarization 106b of incident light diffracted in the second direction onto a second portion of the image sensor 112. Different examples of metasurfaces which diffract light in different directions based on different properties of light are described in U.S. patent application Ser. No. 18/194,359, entitled "Polarization Sorting Metasurface Microlens Array Device" and filed Mar. 31, 2023, which is hereby incorporated by reference in its entirety for all purposes.

In some embodiments, the first metasurface 102 may be positioned inside the opening of the aperture 104. In some embodiments, the first metasurface 102 may be positioned in front of the aperture 104. In some embodiments, the first metasurface 102 may be positioned behind the aperture 104.

In some embodiments, the second metasurface of the planar diffractive lens 109 may be positioned on the top surface and/or the bottom surface of the substrate 108.

While the first metasurface 102 may diffract the light based on the polarization of the incident light, the first metasurface 102 may also diffract light based on other parameters such as wavelength (e.g. different colors).

In some embodiments, the aperture 104 and the first metasurface 102 may be on the front side or back side of a substrate 114. In some embodiments, the planar diffractive lens 109 may be combined with the bandpass filter 110 with the bandpass filter 110 above or below the planar diffractive lens 109. In some embodiments, the bandpass filter 110 may be separate from the planar diffractive lens 109 and above or below the planar diffractive lens 109. In some embodiments, the bandpass filter 110 may be attached to the back of the substrate 114 opposite the first metasurface 102 and/or the aperture 104. In some embodiments there may be a polarization filter. In some embodiments, the imaging system may include a polarization filter and/or various types of bandpass filters. In some embodiments, the substrates and materials may be different between the various elements. In some embodiments, the image sensor 112 may include various types of sensor and/or may include an array of separated sensors. The array of separate sensors may include individual sensors that are sufficiently far apart so that various sub-images do not overlap. The bandpass filter 110 may be between the last lensing element of the imaging system and the image sensor 112 because it minimizes the angle of the marginal rays in a telecentric design which allows the bandpass filter 110 to have a narrower notch.

Figure 2:
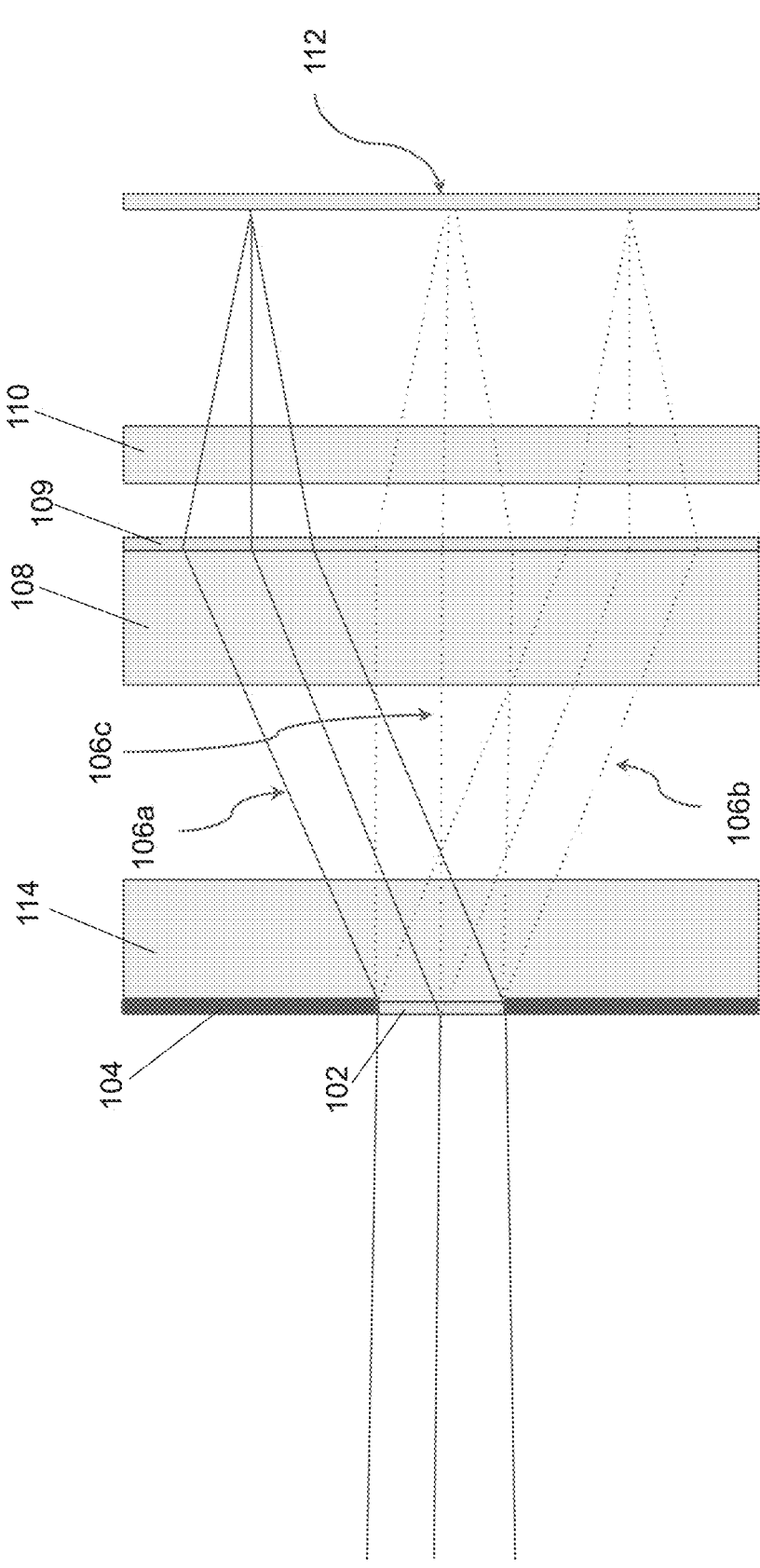
FIG. 2 schematically illustrates a shared aperture imaging system in accordance with an embodiment of the invention.

FIG. 2 schematically illustrates a shared aperture imaging system in accordance with an embodiment of the invention. The imaging system shares many identically numbered components with the imaging system described in connection with FIG. 1. The description of these components is applicable to the imaging system of FIG. 2 and the descriptions will not be repeated in detail. The first metasurface 102 may diffract the incident field into the first sub-image 106a and the second sub-image 106b. Also, the first metasurface 102 may pass zero order light 106c. The zero order light 106c may not include lensing function at the first metasurface 102. The zero order light 106c from the first metasurface 102 may be imaged and in-focus at the image sensor 112. The imaged zero order light 106c may be taken into account during calibration and image synthesis. For example, the zero order light 106c may be separately characterized and thus may be subtracted from the other sensed light. The second metasurface 109 may focus the zero order light 106c onto a third portion of the image sensor different than the first portion and second portion of the image sensor.

Figure 3:
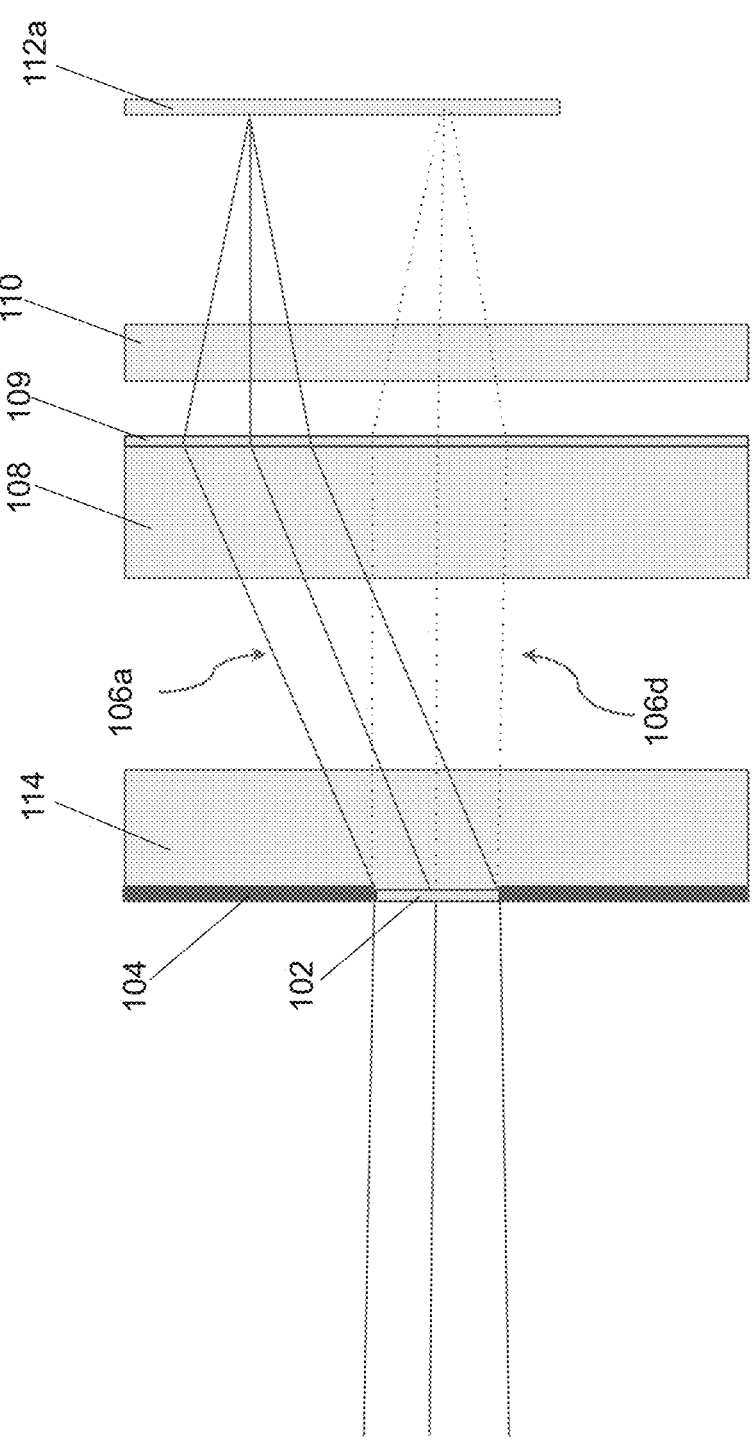
FIG. 3 schematically illustrates a shared aperture imaging system in accordance with an embodiment of the invention.

FIG. 3 schematically illustrates a shared aperture imaging system in accordance with an embodiment of the invention. The imaging system shares many identically numbered components with the imaging system described in connection with FIG. 1. The description of these components is applicable to the imaging system of FIG. 3 and the descriptions will not be repeated in detail. The first metasurface 102 may diffract the incident field into a first sub-image 106a. The first metasurface 102 may pass light 106d. The chief rays of the first sub-image 106a may include a first polarization and the passed light 106d may include zero order light and a second polarization light. The first sub-image 106a and the passed light 106d may be incident on an image sensor 112a. The image sensor 112a may be offset such that the image sensor 112a is smaller than the overall size of the aperture 104 and/or the planar diffractive lens 109. Thus, the image sensor 112a may be smaller relative to the image sensor of the device disclosed in FIGS. 1 and 2 which may save costs. This architecture may alleviate the issue of zero order light overlap at the sensor. The offset image sensor 112a may make the zero order image one of the sub-images.

Figure 4:
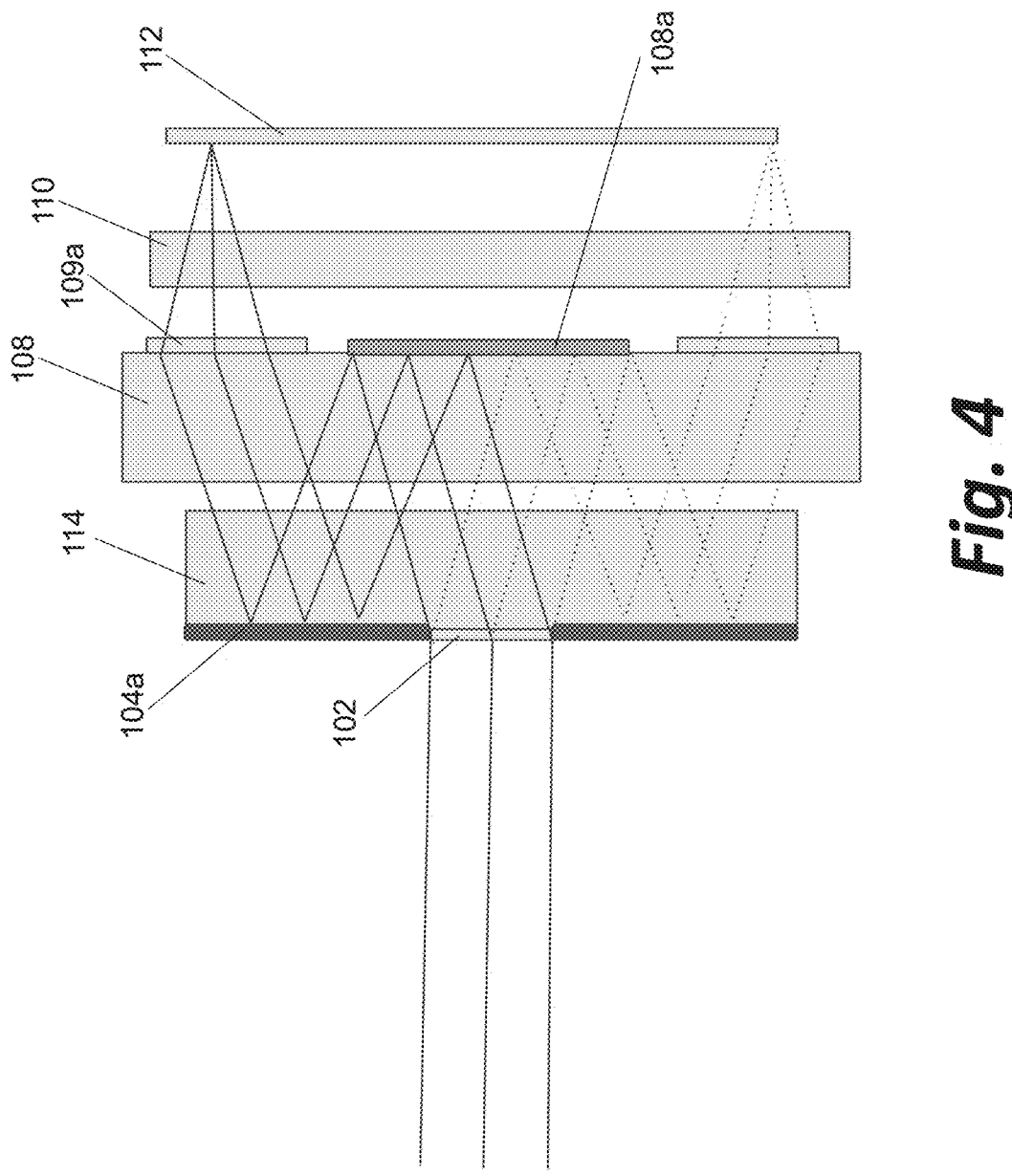
FIG. 4 schematically illustrates a compact shared aperture imaging system with a folded architecture in accordance with an embodiment of the invention.

FIG. 4 schematically illustrates a compact shared aperture imaging system with a folded architecture in accordance with an embodiment of the invention. The imaging system shares many identically numbered components with the imaging system described in connection with FIG. 1. The description of these components is applicable to the imaging system of FIG. 4 and the descriptions will not be repeated in detail. The compact shared aperture imaging system may include a folded optical path. The incident field may be diffracted by the first metasurface 102 into a first sub-image 106a and a second sub-image 106b. The intensity of each diffraction order may be dependent on the information in the field (e.g. wavelength, polarization). The first metasurface 102 may be positioned in an aperture 104a. The aperture 104a may include a reflective back side. Further, a reflective surface 108a may be positioned on bottom side of the substrate 108 such that a planar diffractive lens 109a is located surrounding the reflective surface 108a. The planar diffractive lens 109a may include many of the same properties as the planar diffractive lens 109 of FIG. 1 and may include a second metasurface. The reflective backside of the aperture 104a and/or the reflective surface 108a may also have diffractive structures on them, to aid in imaging performance. The diffractive structures may include metasurface elements. The diffractive structure on the reflective surface 108a may provide lensing prior to the lensing performed by the second metasurface of the planar diffractive lens 109a. Further, the diffractive structures on the reflective back side of the aperture 104a may also provide lensing prior to the lensing performed by the metasurface of the planar diffractive lens 109. In some embodiments, the first metasurface 102 may also perform lensing prior to the lensing performed by the metasurface of the planar diffractive lens 109a. While the illustrated folded optical substrate only includes a single reflective bounce off the reflective surface 108a and the reflective back side of the aperture 104a, it has been contemplated that the device may accommodate multiple optical bounces off the reflective surface 108a and the reflective back side of the aperture 104a as well.

In some embodiments, the first sub-image 106a and the second sub-image 106b may be oppositely circularly polarized light. For example, the first metasurface 102 may diffract the incident field into the first sub-image 106a as right circularly polarized (RCP) light and the second sub-image 106b as left circularly polarized (LCP) light. Advantageously, this allows the second metasurface of the planar diffractive lens 109a to be specialized to operate on RCP or LCP-polarized light, improving efficiency and performance. In the case of splitting into more than two paths, some paths may share polarization states.

Figure 5:
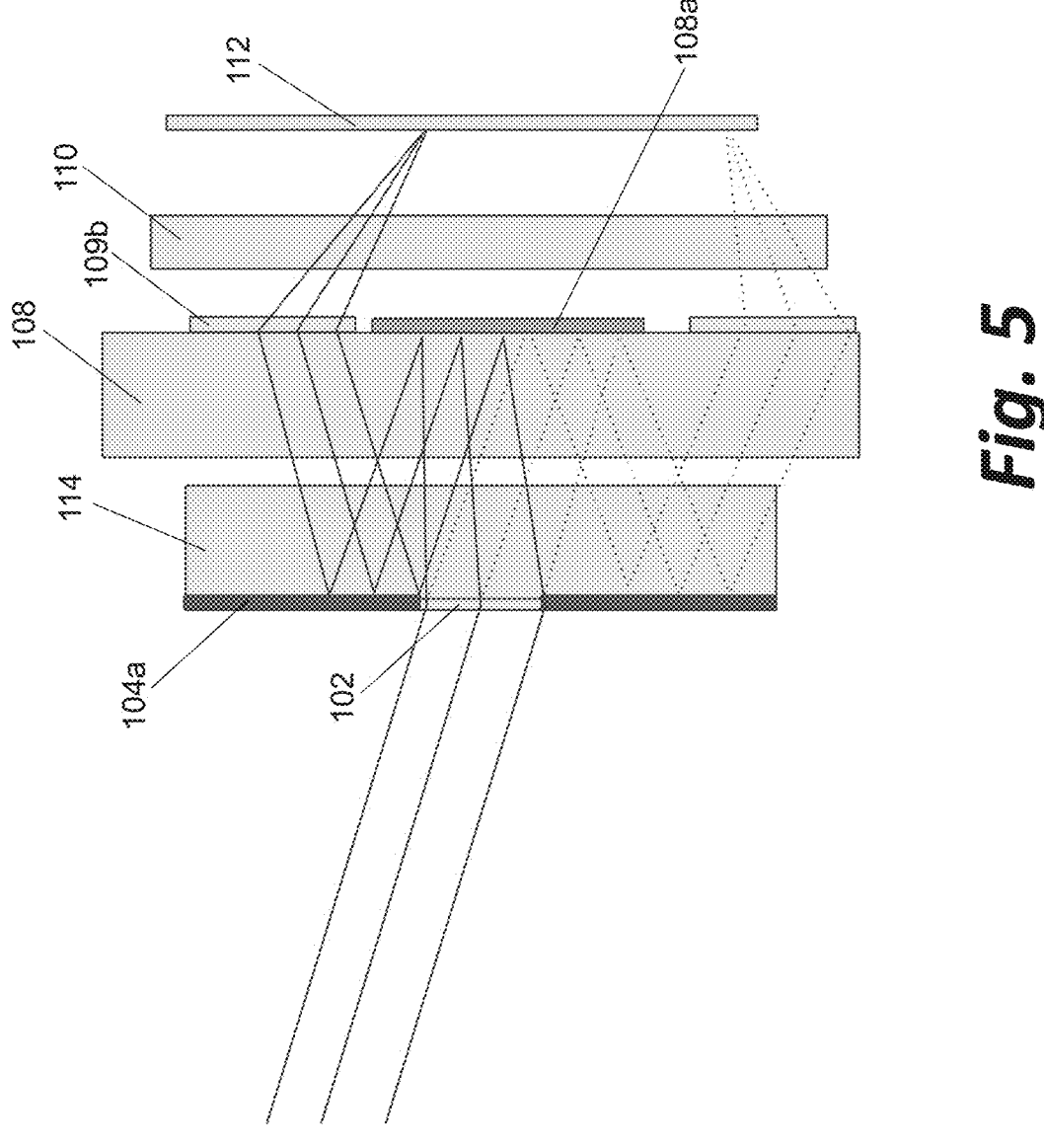
FIG. 5 schematically illustrates a compact shared aperture imaging system with a folded architecture in accordance with an embodiment of the invention.

FIG. 5 schematically illustrates a compact shared aperture imaging system in accordance with an embodiment of the invention. The imaging system shares many identically numbered components with the imaging system described in connection with FIG. 4. The description of these components is applicable to the imaging system of FIG. 5 and the descriptions will not be repeated in detail. As illustrated, the first sub-image 106a and/or the second sub-image 106b after the planar diffractive lens 109b may also bend inwards, to fill the center of the image sensor 112 more fully. The planar diffractive lens 109b may be configured to bend the light inwards.

In some embodiments, the shared aperture imaging system described in connection with at least one of FIGS. 1-5 may be incorporated in the back of a display device. For example, the imaging system may image different polarizations of light or different wavelengths of light from in back of the display device. The display device may be an organic light emitting diode (OLED) display or a liquid crystal display (LCD).

FIG. 6 schematically illustrates an example image sensor utilizing sub-images in accordance with an embodiment of the invention. The image sensor 112 may include multiple sub-images 604 which may appear on the image sensor 112. The sub-images 604 may then be synthesized into one synthesized image 606 by combining the different sub-images 604 into a single image. This technique can increase resolution of the imaging system without registration concerns because the images share an aperture. For example, four noisy images may be combined into one less noisy image which may increase the resolution of the one image. Furthermore, building a mapping to a higher-resolution version of one image which is filled in by multiple sub-images.

Figure 7:
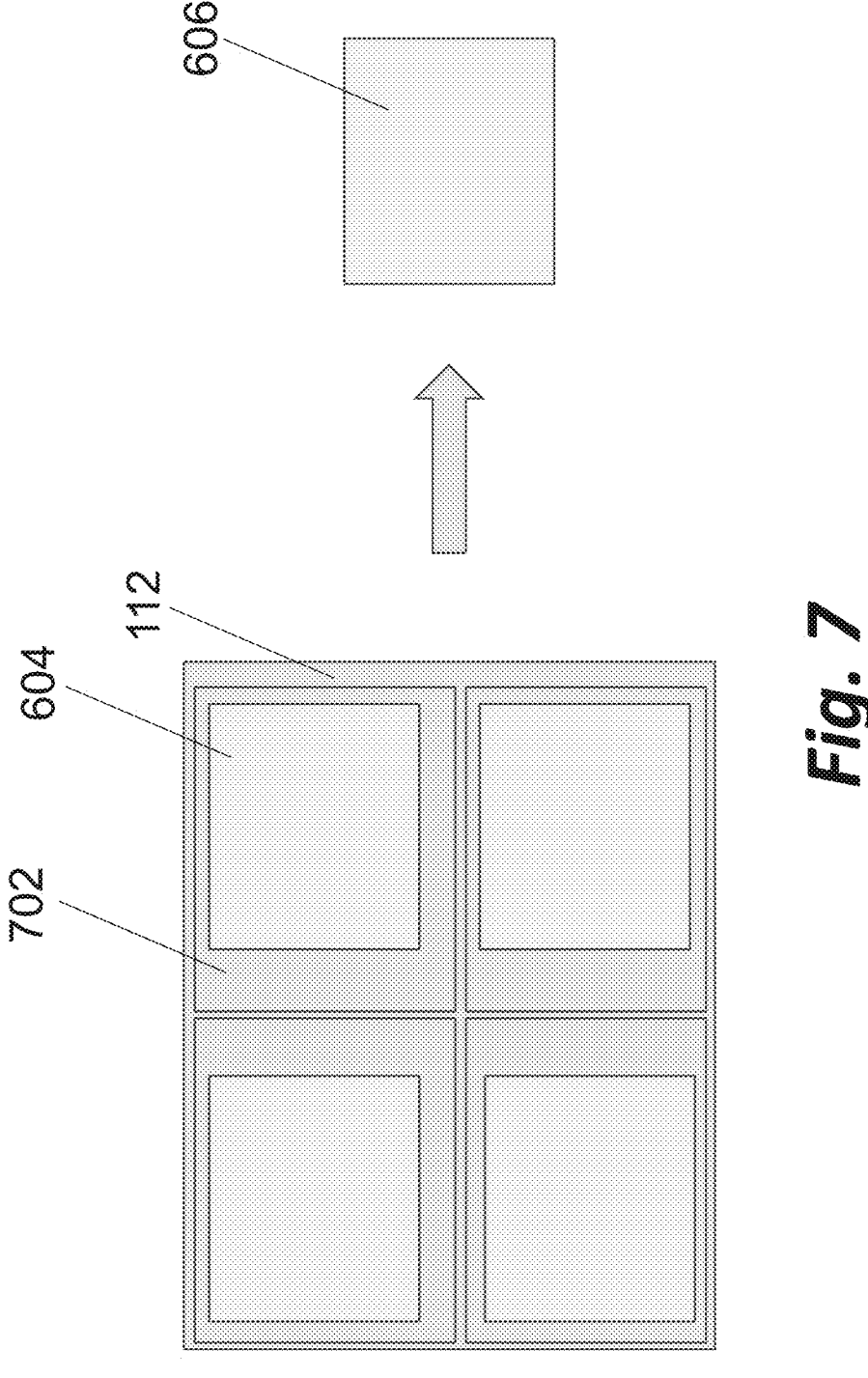
FIG. 7 schematically illustrates an example image sensor system utilizing sub-images in accordance with an embodiment of the invention.

FIG. 7 schematically illustrates an example image sensor system utilizing sub-images in accordance with an embodiment of the invention. The imaging system shares many identically numbered components with the imaging system described in connection with FIG. 6. The description of these components is applicable to the imaging system of FIG. 7 and the descriptions will not be repeated in detail. The image sensor 112 may include filters 702 overlaying the sub-images 604 having additional wavelength filtering capability. Each filter 702 may be tuned to its respective sub-image's nominal wavelength, so each sub-image 604 appears in-focus for the nominal wavelength, avoiding chromatic aberration. The sub-images 604 may then be synthesized into a single color image 606. The sub-images 604 may also be sorted by color due to the action of the first metasurface or other components in the system.

Example Calibration Technique

This disclosure includes a calibration technique utilizing the imaging sensor systems described above. FIGS. 8A and 8B illustrate two steps in the calibration technique in accordance with an embodiment of the invention. Small segments of a full FOV 804 may be illuminated, varying polarization across. First, in FIG. 8A, a first sub-FOV 802a of a full FOV 804 may be illuminated by a light source of known polarization causing reflected light with a polarization signature. Different sub-FOVs of the full FOV 804 may be produced by a calibration light box which may have a known polarization signature. In some embodiments, different sub-FOVs of the full FOV 804 may be produced by Kohler-like illumination with apertured FOV.

A polarization camera 806 may be positioned to receive the polarization signature. The polarization camera 806 may be one of the shared aperture imaging systems described in connection with FIGS. 1-5. As described above, the polarization camera 806 may diffract different polarizations of light into different portions of an image sensor 808. The different portions of the image sensor 808 may not overlap.

Next, in FIG. 8B a second sub-FOV 802b of the full FOV 804 may be illuminated by a light source of known polarization causing reflected light with a polarization signature. The polarization camera 806 may diffract different polarizations of light into different portions of the image sensor 808. The portions of the image sensor 808 illuminated by the diffracted light from the second sub-FOV 802b may be translated 810 from the diffracted light from the first sub-FOV 802a based on the position of the second sub-FOV 802b.

The positioning of the sub-FOV (e.g. the difference between the position of the first sub-FOV 802a and the second sub-FOV 802b) may cause a translation of the diffracted light on the image sensor 808. Thus, the positioning of the diffracted light on the image sensor 808 may be correlated to the positioning of the sub-FOV.

Further, the distinct polarization of the reflected light from the first sub-FOV 802a or the second sub-FOV 802b may cause different intensities of diffracted light on the image sensor 808 to sensed. Thus, the different intensities of the diffracted light on the image sensor 808 may be correlated to the polarization of the reflected light from the sub-FOV. A linear operator may allow backtracking from the images captured on the image sensor 808 to position and polarization of incident light on the image sensor 808. Combining the different images may then allow for the full FOV 804 to be reconstructed when the full FOV 804 is imaged.

In some embodiments, instead of changing the part of the calibration target that is illuminated, the calibration target is fixed and the camera may be moved around instead. This may have the same effect as changing the field of view being calibrated.

Figure 9:
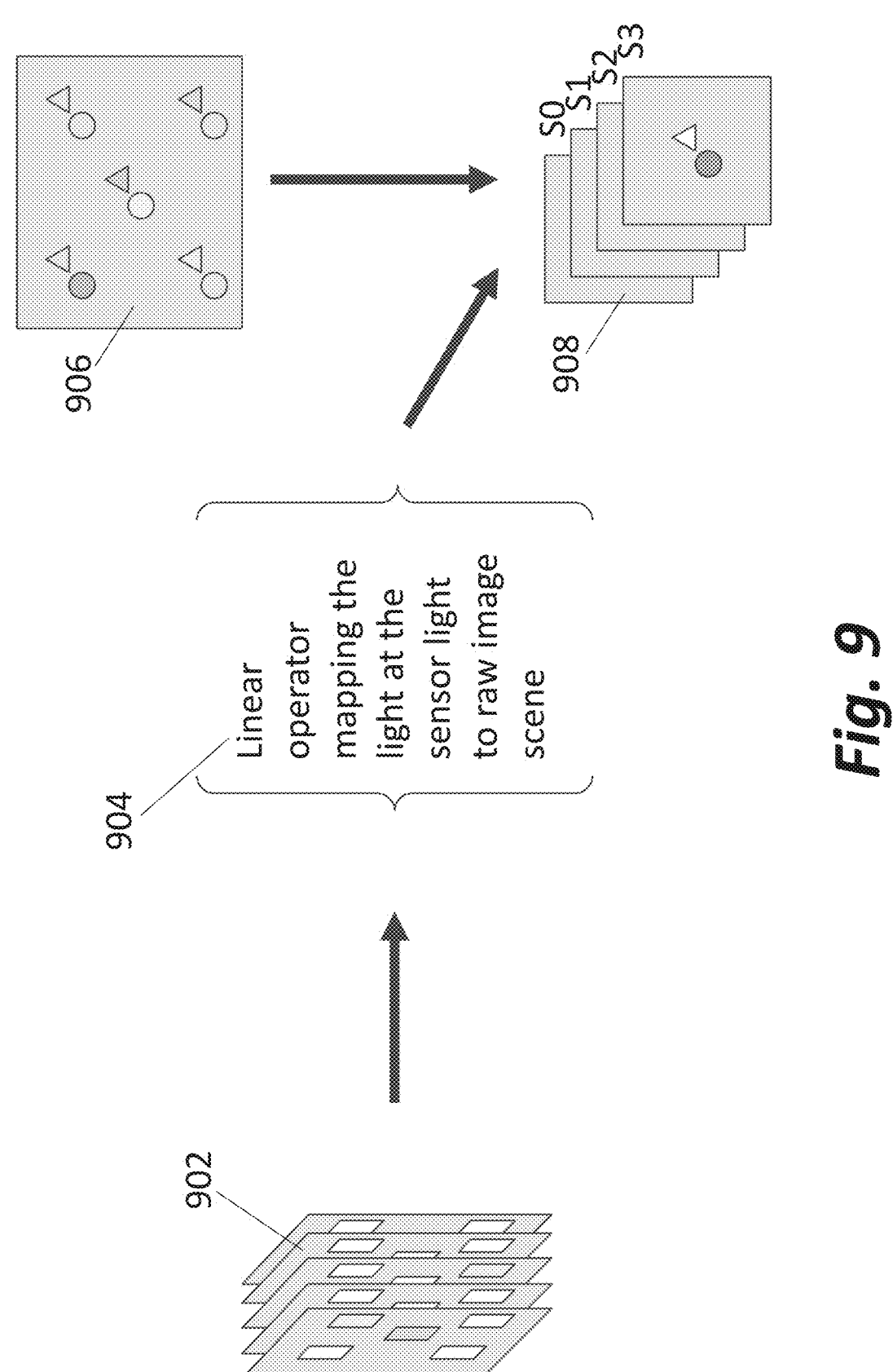
FIG. 9 schematically illustrates a calibration process in accordance with an embodiment of the invention.

FIG. 9 schematically illustrates a calibration process in accordance with an embodiment of the invention. As discussed in connection with FIGS. 8A and 8B, the different sub-FOVs of the full FOV 804 may produce different translated diffracted light onto different portions of the image sensor 808. A fully previously characterized raw sensor image 906 may be used to solve for a linear operator describing mapping from a scene to raw sensor intensity. A sequence of sensor images 902 with known incident polarization and illuminated sub-FOV may be produced. This sequence of sensor images 902 may be processed using the sequence of sensor images 902 to synthesize and identify scene intensity with "raw" sensor intensity. A linear operator 904 describing mapping from a scene to raw sensor intensity may be used to solve for different raw sensor images 906 at different sub-FOVs. The mapping in the linear operator 904 may be inclusive of Stokes parameters. The raw sensor image 906 may be used to solve the linear system with a calibrated operator. Since the raw sensor image 906 is known including the positioning and polarization intensity of the features 908 of the raw sensor image 906, a correlation may be developed for each of the sensor images 902 with the features 908 of the raw sensor image 906. This correlation may form the basis of the linear operator 904 mapping a particular sensor image 902 to one of the features 908.

FIG. 10 is a flow chart illustrating a calibration process in accordance with an embodiment of the invention. The process includes providing (1002) a raw image scene with various features including known polarization signatures. The raw image scene may be a 4×P×Q-sized array of different features. The different features each may have different channels for each Stokes parameter.

The process further includes providing (1004) a polarization camera configured to diffract light into an image sensor configured to sense multiple sub-FOVs of the raw image scene. The image sensor may be an N×M sized array. The polarization camera may be one of the shared aperture imaging systems described in connection with FIGS. 1-5.

The process further includes sequentially illuminating (1006) the sub-FOVs of the raw image scene. The sub-FOVs may reflect light with a certain polarization signature back to the polarization camera. Since the raw image scene includes a known polarization signature, the reflected light may also have a known polarization signature. In some embodiments, the illuminating the sub-FOVs may be performed through a synthetic set-up which may include either an apertured light box, moving transverse field stop of camera, or apertured Kohler illumination, such that the projected images of the sub-FOV on the image sensor do not overlap.

The process further includes measuring (1008) the incident light on the image sensor of each of the sub-FOVs. In some embodiments, the polarization camera may include a set of polarization lenses which may modify the polarization of the diffracted light into the image sensor. Due to how the polarization camera works the intensity of each segment in the image sensor may change. For the different sub-FOVs, the diffracted light onto the image sensor may translate based on the positioning of the different sub-FOVs. This translation is described in FIGS. 8A and 8B. For each sub-FOV, the intensity of the diffracted light onto different positions of the image sensor may be based on the intensity of different polarizations of light within the diffracted light. Examples of the general operations of the polarization camera are described in connection with FIGS. 1-5.

The process further includes identifying (1010) a linear operator which corresponds to the light sensed by the image sensor for each sub-FOV to a portion of the raw image scene including various features including known polarization signatures. The portion of the raw image scene may include scene coordinates as given in the synthetic scene set onto pixel coordinates of the image sensor. The scene coordinates may be inclusive of the Stokes parameter. This may be performed by parsing the sequence of calibration images. Thus, the linear operator may correspond each of the sub-FOVs with a real image.

As described above, for the different sub-FOVs, the diffracted light onto the image sensor may translate based on the positioning of the different sub-FOVs. Thus, the positioning of the diffracted light on the image sensor may correspond to the positioning of the different sub-FOVs. Also, the intensity of the diffracted light onto different positions of the image sensor may be based on the intensity of different polarizations of light within the diffracted light. Thus, the intensity of the light on the image sensor may correspond to the polarization of the light of the different sub-FOVs. The polarization of the raw image scene may be known. Thus, a linear operator may be developed which may correlate the light sensed by the image sensor with light of a specific polarization and location.

Figures 11A, 11B, 11C:
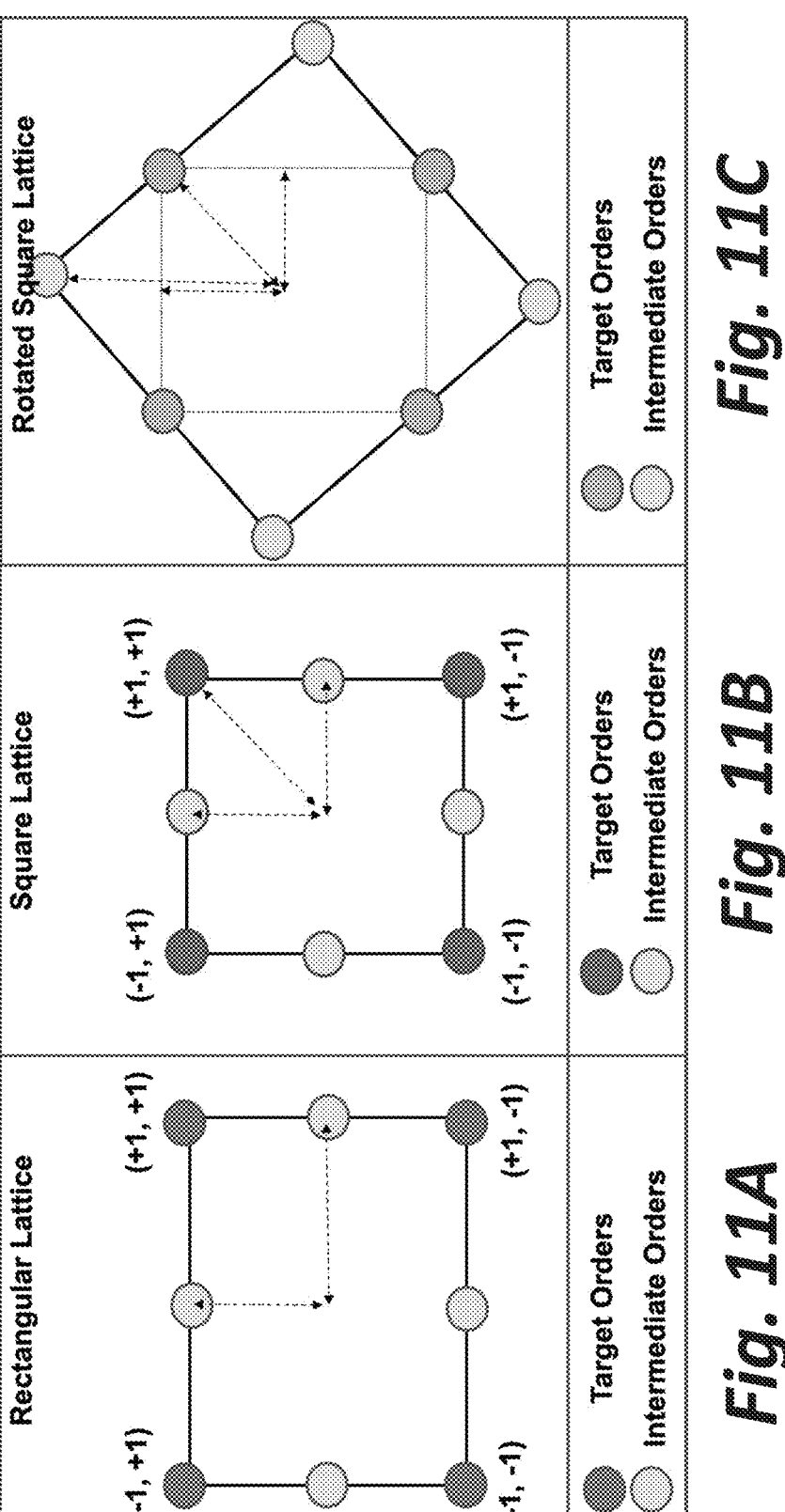
FIGS. 11A-11C illustrate various configurations of the metasurface including a configuration where the metasurface is rotated 45° relative to the sensor axes.

A registration image can be used to identify the relationship between spatial scene coordinates and pixel coordinates of each sub-FOV. A registration image may be an image taken with known features which helps identify how the pixels on the sensor map to field points (e.g. directions the camera is looking). FIGS. 11A-11C illustrate various configurations of the metasurface including a configuration where the metasurface is rotated 45° relative to the sensor axes. The sensor axes may be the axes aligned to the rectangular sides of the sensor. For example, in a rectangular image sensor, the metasurface may be arranged periodically on a lattice. That lattice may also be rectangular or square. FIGS. 11A and 11B illustrate the case where the axes of the lattice are pointed in the same direction as the axes of the sensor. FIG. 11C illustrates the case where the metasurface lattice is rotated by 45°. In this case, the axes of the metasurface lattice are rotated 45° with respect to the sensor lattice. This embodiment may eliminate or reduce the "intermediate" orders, which can be an issue. The intermediate orders may be orders that are within the "support" of the reciprocal space of the lattice but which are not targeted for the design. "Support" may be defined as the domain of a function. Given a lattice the periodic metasurface is defined on, the reciprocal lattice defines what angles the lattice diffracts to. By choosing a square lattice and rotating it 45°, there may be no intermediate orders in certain specific regions. The "Rectangular" and "Square Lattice" illustrated in FIGS. 11A and 11B may be more typical embodiments. However, by rotating the grating lattice 45°, the presence of intermediate orders may be avoided between the target orders. Unwanted intermediate orders may cause intermediate sub-images which negatively impact image quality upon reconstruction.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A polarization imaging device comprising:

an aperture;

a first metasurface configured to diffract incident light going through the aperture such that a first polarization of incident light diffracts in a first direction and a second polarization of the incident light diffracts in a second direction;

an image sensor;

a planar diffractive lens including a second metasurface configured to focus the first polarization of incident light diffracted in the first direction onto a first portion of the image sensor and focus the second polarization of incident light diffracted in the second direction onto a second portion of the image sensor;

a first substrate, wherein the planar diffractive lens is positioned on the first substrate; and a reflective surface positioned on the first substrate, wherein the backside of the aperture is reflective, and wherein the reflective surface and the shared aperture create a folded optical path configured to fold the diffracted light.

2. The polarization imaging device of claim 1, further comprising a bandpass filter positioned between the planar diffractive lens and the image sensor.

3. The polarization imaging device of claim 1, wherein the first metasurface is positioned within an opening of the aperture.

4. The polarization imaging device of claim 1, wherein the aperture and the first metasurface are positioned on a same surface of a substrate.

5. The polarization imaging device of claim 4, wherein the aperture and the first metasurface are positioned on a surface of the substrate closest to the incident light.

6. The polarization imaging device of claim 4, wherein the aperture and the first metasurface are positioned on a surface of the substrate opposite to the incident light.

7. The polarization imaging device of claim 1, wherein the first metasurface is further configured to pass a zero order light.

8. The polarization imaging device of claim 7, wherein the planar diffractive lens is further configured to focus the zero order light onto a third portion of the image sensor.

9. The polarization imaging device of claim 1, wherein the first metasurface directs both the zero order light and the second polarization of the incident light in the same direction.

10. The polarization imaging device of claim 9, wherein the planar diffractive lens focuses both the zero order light and the second polarization of the incident light onto the second portion of the image sensor.

11. The polarization imaging device of claim 9, wherein the image sensor has a smaller width than the width of the aperture and/or the planar diffractive lens.

12. The polarization imaging device of claim 1, wherein the reflective surface and/or the reflective backside of the shared aperture include diffractive structures.

13. The polarization imaging device of claim 12, wherein the diffractive structures include metasurface elements.

14. The polarization imaging device of claim 1, wherein the aperture and the first metasurface are positioned on a same surface of a second substrate and wherein the folded optical path passes through the second substrate.

15. The polarization imaging device of claim 1, wherein the reflective surface is positioned to cover a portion of the first substrate, the planar diffractive lens surrounds the reflective surface, and the diffracted light reflects off the reflective surface, reflects off the reflective backside of the aperture and diffracts through the planar diffractive lens.

\* \* \* \* \*